United States Patent
Nguyen et al.

(10) Patent No.: US 8,770,158 B1
(45) Date of Patent: Jul. 8, 2014

(54) HYBRID VEHICLES WITH RADIAL ENGINES

(71) Applicant: Thien Ton Consulting Services Company Limited, Ho Chi Minh (VN)

(72) Inventors: Tai Dung Nguyen, Fremont, CA (US); Tue Nguyen, Fremont, CA (US); Donald James Duncalf, Lehigh Acres, FL (US)

(73) Assignee: Thien Ton Consulting Services Co., Ltd., Ho Chi Minh (VN)

( * ) Notice: Subject to any disclaimer, the term of this patent is extended or adjusted under 35 U.S.C. 154(b) by 0 days.

(21) Appl. No.: 13/911,042

(22) Filed: Jun. 5, 2013

(51) Int. Cl.
   *F02B 75/22* (2006.01)

(52) U.S. Cl.
   USPC .................. 123/54.3; 123/197.3; 123/197.4

(58) Field of Classification Search
   USPC ................... 123/54.3, 197.3, 197.4
   See application file for complete search history.

(56) References Cited

U.S. PATENT DOCUMENTS

| | | | | |
|---|---|---|---|---|
| 1,829,780 A * | 11/1931 | Beytes et al. | | 123/323 |
| 2,120,657 A * | 6/1938 | Tucker | | 123/54.3 |
| 4,381,740 A * | 5/1983 | Crocker | | 123/54.3 |
| 5,264,764 A | 11/1993 | Kuang | | |
| 5,553,574 A | 9/1996 | Duncalf | | |
| 5,836,234 A * | 11/1998 | Chen et al. | | 92/72 |
| 6,328,122 B1 * | 12/2001 | Yamada et al. | | 180/65.23 |
| 6,691,648 B2 | 2/2004 | Beierle | | |
| 7,100,549 B2 * | 9/2006 | Humphries | | 123/56.2 |
| 7,689,344 B2 * | 3/2010 | Kang et al. | | 701/103 |
| 2003/0085063 A1 | 5/2003 | Wakitani | | |
| 2006/0137630 A1* | 6/2006 | Maslen | | 123/54.3 |
| 2007/0199525 A1* | 8/2007 | Skulic | | 123/54.3 |
| 2007/0200347 A1* | 8/2007 | Sulzer | | 290/40 C |
| 2010/0084211 A1 | 4/2010 | Seidel | | |
| 2011/0031051 A1 | 2/2011 | George | | |

FOREIGN PATENT DOCUMENTS

JP          2003061210          2/2003

* cited by examiner

*Primary Examiner* — Marguerite McMahon
*Assistant Examiner* — James Kim
(74) *Attorney, Agent, or Firm* — Tue Nguyen

(57) ABSTRACT

A radial cam engine with an optimized cam configuration can provide improve performance over crankshaft internal combustion engines. The cam configuration can include a flat-top or flat bottom piston motion, multiple lobe cam configurations, matching piston force with torque/force ratio in combustion phase, asymmetry piston motions for improved power transfer during combustion phase, and/or offset piston and cam configurations. The radial cam engine can be used in vehicles, such as hybrid vehicles.

17 Claims, 22 Drawing Sheets

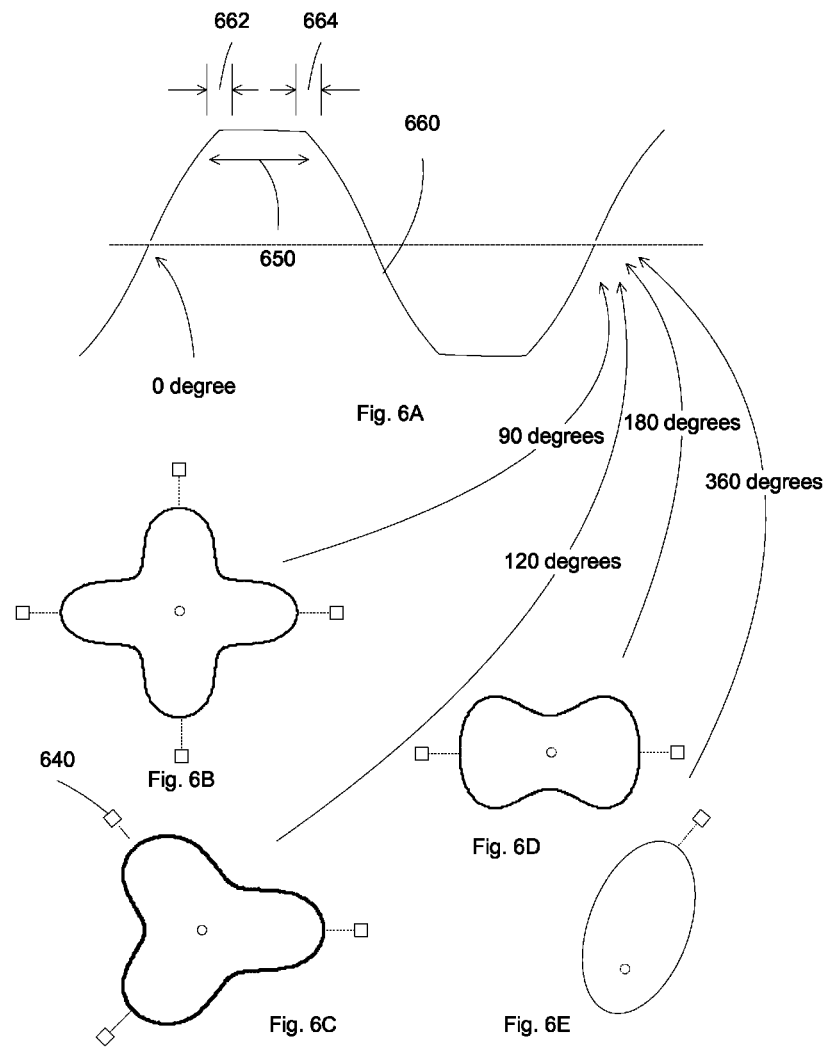

HYBRID VEHICLES WITH RADIAL ENGINES

The present invention relates to application Ser. No. 13/296,196, filed on Nov. 14, 2011, entitled "Electric vehicles with extended range", hereby incorporated by reference in its entirety.

BACKGROUND

Conventional vehicles, such as passenger cars or automobiles, Sports Utility Vehicles (SUV), trucks use fossil-fuel powering an internal combustion engine having a crankshaft. Fuel cost and environmental concern for this type of engine have promoted a need for alternatives.

SUMMARY

In some embodiments, radial cam engines are provided with improved performance, for example, as compared to crankshaft engines. The radial cam engines can be operated by an internal combustion assembly, such as a piston and cylinder configuration that uses gasoline, diesel, natural gas, compressed gas, hydrogen gas, or any other source of power. The radial cam engine can include a cam and a camshaft, which can be coupled to the piston and cylinder configuration to convert the linear movement of the piston to a rotation movement of the camshaft. In some embodiments, the cam configurations and/or the positions of the piston with respect to the cam can be designed to optimize the radial cam engines, such as maximizing the fuel consumption efficiency, maximizing the power generated by the internal combustion assembly, and minimizing the power loss in the conversion of linear movement to rotation movement. In addition, the radial cam engine can be configured for optimal performance in steady speed configuration, such as for an electrical generator or for a vehicle running at stead speed.

In some embodiments, vehicles with radial cam engines are provided. The vehicles can be hybrid vehicles, with each hybrid vehicle having an electrical motor and a radial cam engine. The electrical motor can be operated by an electrical power source, such as a battery, and the radial cam engine can be operated by another source of power, such as gasoline, diesel, natural gas, compressed gas, or hydrogen gas. The electrical motor can be used at low speed or stop-and-go distance, such as in local or short distance travel. The radial cam engine can be used at high or steady speed, such as in long distance or highway traveling. Alternatively, the radial cam engine can be used in a constant speed configuration to recharge the battery, extending the range of the hybrid vehicles.

In some embodiments, the electrical motors can be configured to provide optimal performance to the vehicles. For example, the electrical motor can be optimized for high torque and low speed traveling, such as city driving or stop-and-go traffic.

In some embodiments, the radial cam engines can be configured to provide optimal performance to the vehicles. Since the movement of the piston in the internal combustion assembly can be governed by the cam configurations of the radial cam engine, the configurations of the cams can be configured to optimize the radial cam engine performance in the vehicles. For example, the radial cam engine can be designed to minimize fuel consumption with maximal power generation. The cam configurations can be designed to maximize a power transfer from the combustion process to the piston linear movement, to maximize a power transfer from the piston linear movement to the camshaft rotation, and to maximize a matching power transfer between the force on the piston and the torque on the camshaft. The cam configurations can be designed to maximize a power ratio between the explosion phase and the compression/expansion phases of the combustion cycles. The relative positions of the piston and the camshaft can be configured to optimize the achievable torque exerted on the camshaft due to the combustion cycles.

In some embodiments, the radial cam engine can be configured to provide optimum performance in high and steady speed, such as for an on-board generator for charging the battery of the hybrid vehicle, or for operating the hybrid vehicle in long distance with constant speed. In some embodiments, the radial cam engine can be configured to provide optimum performance in low speed, such as an emergency engine to operate a hybrid vehicle to a charging station when the battery is depleted.

BRIEF DESCRIPTION OF THE DRAWINGS

FIGS. 6A-6E illustrate a piston cycle corresponded to various cam profiles according to some embodiments.

DETAILED DESCRIPTION OF THE PREFERRED EMBODIMENTS

The present invention discloses radial cam engines with improved performance, and vehicles having a radial cam engine and methods to operate such vehicles.

Figure 1:
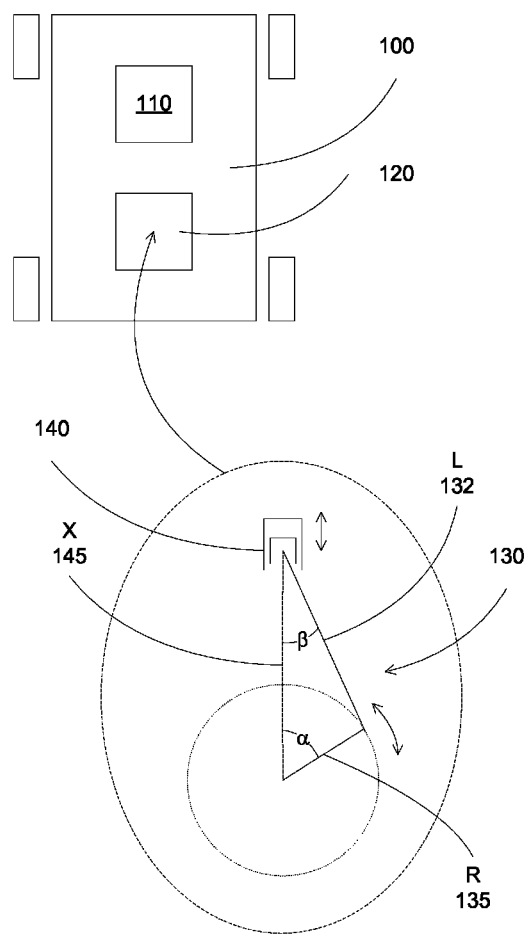
FIG. 1 illustrates a schematic of a vehicle with an internal combustion engine drive system having a crankshaft according to some embodiments.

FIG. 1 illustrates a schematic of a vehicle with an internal combustion engine drive system having a crankshaft according to some embodiments. The drive system typically includes an engine 120 coupled to a transmission to drive the axle of the vehicle 100. A fuel tank provides fuel, such as gasoline or diesel, to the engine 120. The vehicle can be a two wheel drive, with the other axle not actively powered. The vehicle can be front-wheel drive or rear-wheel drive. There are other configurations of vehicle architectures, such as four-wheel drive configurations. The engine 120 can include an internal combustion assembly, which includes a piston/cylinder configuration 140. The piston/cylinder configuration 140 can provide a linear movement of the piston, due to the combustion action of the fuel in the cylinder chamber. The piston can be coupled to a crankshaft 130, which can turn the linear motion of the piston 140 into a rotating motion of the crankshaft 130.

Currently, there is pressing concern that oil supply will soon be not adequate to meet the rising demands of energy consumption. In addition, there are serious environmental issues, such as green house emission, associated with internal combustion engines employing gasoline or diesel.

Electric vehicles have gained popularity in recent years as the potential replacement for internal combustion vehicles, since they promise zero emission from electric drive system, and a break away from oil dependency.

The vehicle 100 can include an electrical drive system 110. The electrical drive system typically includes an electrical motor coupled to a transmission to drive the vehicle axles. A battery can provide electrical power to the motor. The motor can power a two wheel axle, with the other axle not actively powered. The electric motor can also power one axle, two axles, or individual wheels.

At the present time, battery and motor technology presents a major drawback for electric vehicles, which translates to lower power and short range. A common problem is the weight and cost of the batteries, which is large and heavy. Furthermore, the capacity of the battery degrades with successive charging cycles. For example, the range of the electric vehicle is generally proportional to the amount of electrical energy stored in the battery. But battery power density is low, and thus the battery contributes significant weight and mass to the electric vehicle, and thus affects the available range and performance of the electric vehicle.

A temporary solution to the shortcoming of battery technology is a combination of electric power and crankshaft combustion engine, which reduces the fuel consumption, increases the power, and extends the range of the electrical motor. For example, an alternate fuel vehicle employs an integration of a diesel or gasoline powered engine and an electric motor. Engine can be used to drive the vehicle, or as a source to charge the battery for the electric power. Other sources can also be employed to charge the batteries including solar, wind, hydraulic, compressed air, bio energy sources.

However, the crankshaft engine can impose significant limitation to the piston. For example, the linear motion 145 of the piston is governed by the length R of the crank 135 and the length L of the connecting rod 132. If $\alpha$ is the angle of the crank 135 and $\beta$ is the angle of the connecting rod L, the motion X of the piston is calculated as followed $$X = L \cos \beta + R \cos \alpha$$

Since $\alpha$ and $\beta$ are related by the sine relationship of the triangle, e.g., $$\frac{\sin\alpha}{L} = \frac{\sin\beta}{R}$$

We have $$X = L\sqrt{(1 - \sin^2\beta)} + R\cos\alpha \qquad (1)$$

$$X = L\sqrt{\left(1 - \frac{R^2}{L^2}\sin^2\alpha\right)} + R\cos\alpha$$

$$X = \sqrt{(L^2 - R^2\sin^2\alpha)} + R\cos\alpha$$

In other words, the position X of the piston 140 is a function of the crankshaft dimensions R and L. Thus the force acting on the piston, which is proportional to the acceleration X" of the piston, is also determined by the crankshaft dimensions R and L. In addition, the power transfer ratio from the piston force to the crank torque is also a function of the crankshaft dimensions R and L. Optimization of the crankshaft engine can be difficult, since there are only two variables R an L. Additional components, such as dampers or counterbalancer might be needed to improve the performance of the crankshaft engine, such as reducing vibration or harmonic oscillation.

In some embodiments, the present invention discloses a radial cam engine, and a vehicle having a radial cam engine, or a camshaft engine, for example, to replace the crankshaft engine. The camshaft engine can have less restriction or limitation as compared to the crankshaft engine due to the flexibility of the cam configurations, which can allow an optimization of the piston movement, together with the power transfer ratio.

Figure 2:
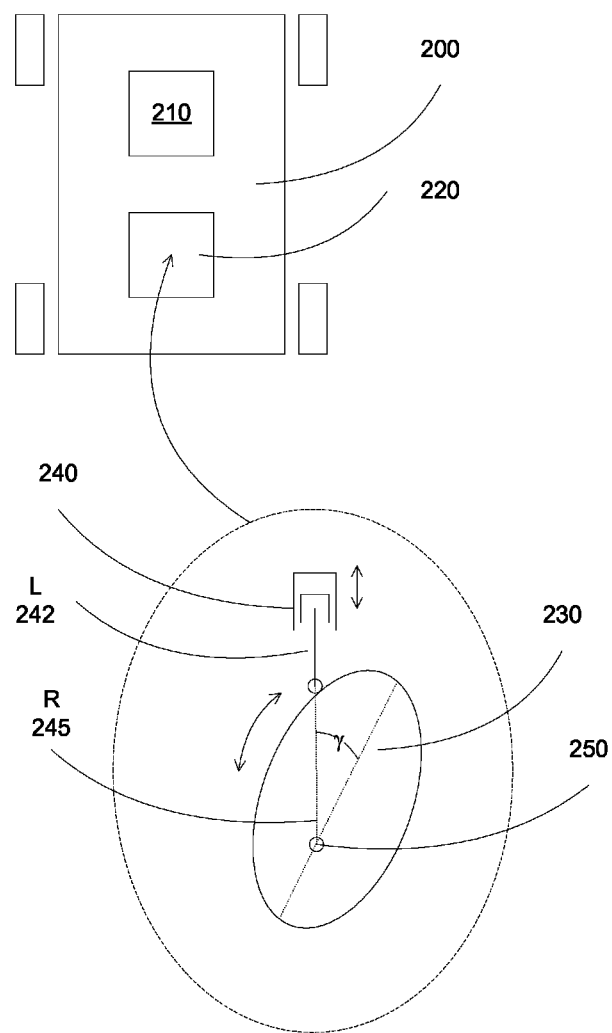
FIG. 2 illustrates a vehicle having a radial cam engine which utilizes internal combustion principle according to some embodiments.

FIG. 2 illustrates a vehicle having a radial cam engine which utilizes internal combustion principle according to some embodiments. A vehicle 200 can include an electrical drive system 210. The electrical drive system typically includes an electrical motor coupled to a transmission to drive the vehicle axles. A battery can provide electrical power to the motor. The motor can power a two wheel axle, with the other axle not actively powered. The electric motor can also power one axle, two axles, or individual wheels.

The vehicle 200 can include a radial cam engine 220, which can include an internal combustion assembly which includes a piston/cylinder configuration 240, similar to a crankshaft engine. The radial cam engine 220 can be coupled to a transmission to drive the axle of the vehicle 200. A fuel tank provides fuel, such as gasoline, diesel, natural gas, hydrogen, or other fuels, to the engine 220. The vehicle can be a two wheel drive, with the other axle not actively powered. The vehicle can be front-wheel drive, rear-wheel drive, or four-wheel drive. The piston/cylinder configuration 240 can provide a linear movement of the piston, due to the combustion action of the fuel in the cylinder chamber. The piston can be coupled to a camshaft 250, which can turn the linear motion of the piston 240 into a rotating motion of the camshaft 250.

The radial cam engine 220 can include a cam 230, which can be coupled to the camshaft 250. A connecting rod 242 can be coupled to the piston 240 and also to the surface of the cam 230. Thus a linear motion of the piston can rotate the cam 230, which in turn, rotates the camshaft 250. The connecting rod 242 can be rigidly coupled to the piston, thus the connecting rod 242 can move up and down, with no side force acting on the piston. The motion X of the piston can be a combination of the connecting rod 242 and the radius 245 of the cam 230

$$X = L + R \quad (2)$$

Thus the motion X of the piston can be related to the radius 245 of the cam, which can be a function of the rotating angle γ, e.g., R(γ). By changing the cam configuration, e.g., varying R as a function of angle γ, the motion X of the piston can be changed accordingly. In other words, the position X of the piston 240 can be a function of multiple dimensions R(γ) of the cam configuration. Other detailed of the radial cam engine can be found in U.S. Pat. No. 5,553,574, hereby incorporated by reference in its entirety.

In some embodiments, the present invention discloses cam configurations that can be used in a radial cam engine of a vehicle, for example, to create a vehicle that has improved performance and lower fuel consumption.

Figure 3A:
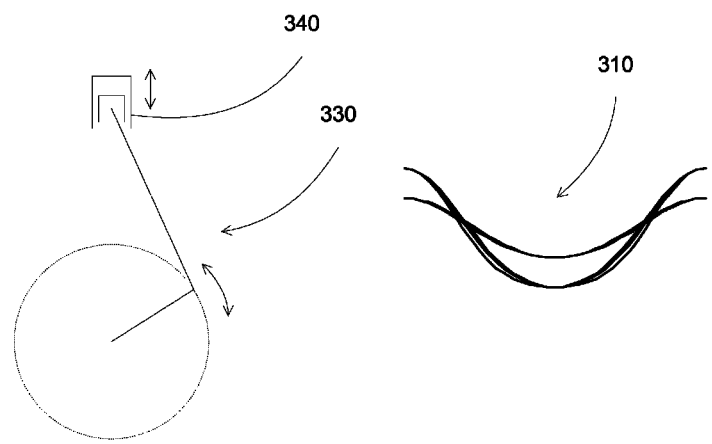
FIGS. 3A-3B illustrate piston motions for a crankshaft engine and a camshaft engine according to some embodiments.
Figure 3B:
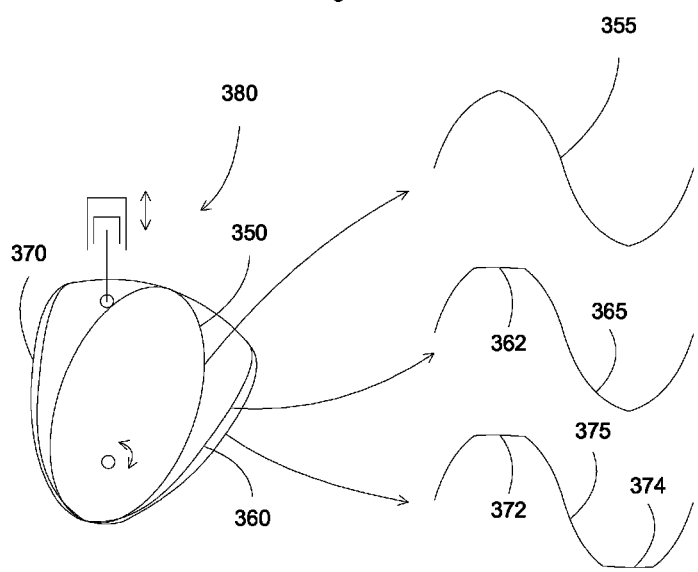

FIGS. 3A-3B illustrate piston motions for a crankshaft engine and a camshaft engine according to some embodiments. In FIG. 3A, a crankshaft engine 330 can include a piston system 340 coupled to a crankshaft system. The linear motions 310 of the piston can be a function of the lengths of the connecting rod and the crank, and can have a sine or cosine shape, as shown by equation (1) above. Different lengths of the connecting rods and cranks can have minimal effect on the shapes of the piston motion, as shown in multiple motion curves 310. Thus the motion of the piston cannot be changed significantly, for example, the shape of the piston always has a sine or cosine form, regardless of the crankshaft engine configurations.

In FIG. 3B, a camshaft engine 380 can include a piston system coupled to a camshaft system. The linear motions of the piston can be a function of the cam geometries, and thus can have practically any shape, as shown by equation (2) above. Different cam geometries can produce different piston motions, for example, cam geometry 350 can generate sine or cosine piston shape 355, cam geometry 360 can generate single flat top 362 sine or cosine piston shape 365, and cam geometry 370 can generate double flat tops 372/374 sine or cosine piston shape 375. Thus the motion of the piston can be changed significantly by changing the cam geometry. The direct relationship between the cam geometry and the piston motion can allow optimizing the piston motion and the piston force to achieve optimal performance and fuel consumption.

In some embodiments, the piston linear motions can be modified, e.g., by changing the cam geometry, to improve the performance of the radial cam engine. For example, from a thermodynamic point of view, the power transfer performance of the combustion engine can be improved if the piston can stay at the top portion during the combustion phase, e.g., during the time of the fuel explosion, and then moving downward when the explosion is completed, e.g., during the expansion phase.

Figure 4:
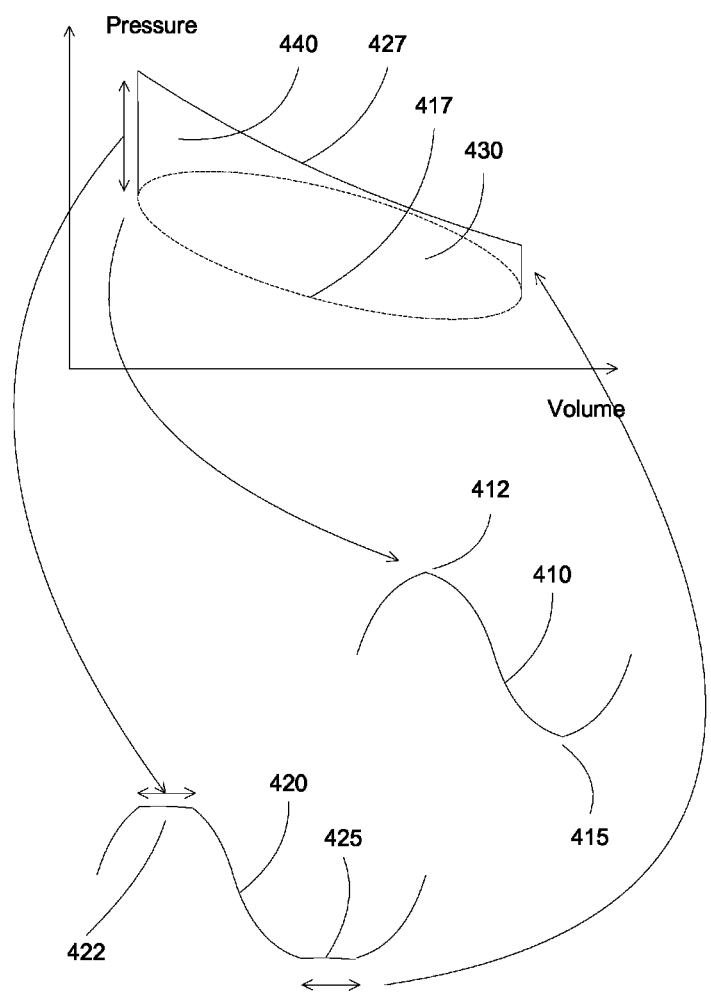
FIG. 4 illustrates a thermodynamic performance schematic for different piston motions according to some embodiments.

FIG. 4 illustrates a thermodynamic performance schematic for different piston motions according to some embodiments. A pressure-volume (PV) curve calculated from the piston motion can be used to provide the power generated from the combustion process. A sine-shape piston motion 410 can exhibit a PV curve 417, with the area 430 inside the PV curve indicating the generated power. Starting from the bottom of the piston position 415 (bottom dead center, BDC), e.g., when the cylinder volume is maximum, the piston can move up to compress the inside gas, corresponding to a movement of the PV curve toward smaller volume and higher pressure. After reaching the top of the piston position 412 (top dead center, TDC), e.g., when the cylinder volume is minimum, the gas can be combusted. The explosion process can drive the piston downward to reduce the pressure, corresponding to a movement of the PV curve toward higher volume and lower pressure. The cycle continues after the piston reaches the BDC position, and starts moving upward to compress the inside gas.

With the sine-shape motion 410 of the piston, when the piston reaches the TDC 412, the piston immediately moves downward, showing the PV curve 417 that is not optimal, since the combustion of the fuel occurs when the piston moves downward, reducing the force on the piston power stroke.

In some embodiments, the present invention discloses a radial cam engine having a cam geometry that can produce a flat top piston motion, which can improve the thermodynamic behavior of the combustion process. A flat-top sine-shape piston motion 420 can exhibit a PV curve 427, with an improvement 440 of the generated power. Starting from the bottom of the piston position 425 (bottom dead center, BDC), e.g., when the cylinder volume is maximum, the piston can move up to compress the inside gas, corresponding to a movement of the PV curve toward smaller volume and higher pressure. After reaching the top of the piston position 422 (top dead center, TDC), e.g., when the cylinder volume is minimum, the gas can be combusted. The explosion process can drive the piston downward to reduce the pressure, corresponding to a movement of the PV curve toward higher volume and lower pressure. The cycle continues after the piston reaches the BDC position, and starts moving upward to compress the inside gas.

With the flat-top sine-shape motion 420 of the piston, when the piston reaches the TDC 422, the piston is kept at this position for a period of time, allowing the PV curve 427 to exhibit a constant volume combustion process. Afterward, the piston can move downward for the expansion phase. The constant volume section of the PV curve 427 can provide better efficiency and performance for the combustion process, since the explosion occurs when the piston is not moving downward (or very slowly moving downward). The improvement in power transfer can be calculated from the difference 440 in flat-top motion 420 and sine-shape motion 410 of the piston.

The piston motion 420 can also include a flat-bottom section 425, which can result in a drop in pressure at a constant volume, further improving the generated power of the combustion process. The PV curves shown are schematic, served to illustrate the thermodynamic behavior of the various piston motions, together with potential improvements of the combustion process for flat-top and/or flat-bottom piston motions. The validity of the present invention is thus not limited by the described theory, but that the invention has the full scope defined by the language of the following claims, and equivalents thereof.

In some embodiments, the flat-top and/or flat-bottom piston motions can be achieved with a cam geometry, for example, a cam having a constant radius at a maximum radius (to form the flat-top portion 422), and/or a constant radius at a minimum radius (to form the flat-bottom portion 425). The flat-top and/or flat-bottom piston motions can improve the power generated by the combustion process, resulting in a radial cam engine with improved performance, e.g., higher power transferred to the rotating shaft or lower fuel consumption.

In some embodiments, the motion of the piston can be smooth, for example, to prevent sudden jumps in velocity, acceleration or jerk. Thus the flat-top or flat-bottom portion can be slightly curved, resulting in a near flat top or near flat bottom profile, having a somewhat constant volume PV curve portion. In general, the more constant the volume, e.g., the flatness of the piston motion at the TDC or the BDC, the better the performance of the combustion engine. Thus the dip in the piston stroke can be used to satisfy other requirements, such as a smooth transition in position, velocity, acceleration and jerk of the piston motion.

Figure 5A:
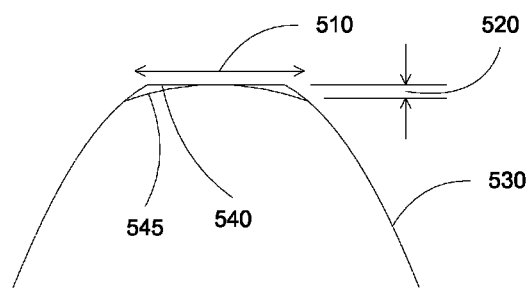
FIGS. 5A-5C illustrate various flat-top motions of a piston according to some embodiments.
Figure 5B:
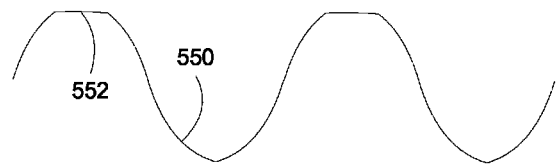
Figure 5C:
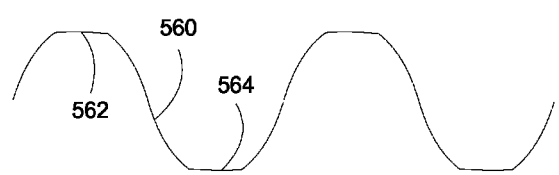

FIGS. 5A-5C illustrate various flat-top motions of a piston according to some embodiments. In FIG. 5A, a flat-top portion 540 and a near flat top portion 545 of the piston motion 530 are shown. The flat-top portion 540 can exhibit a true constant volume in the PV curve, indicated by a constant motion 540 of the piston. The near flat-top portion 545 can exhibit a practical constant volume, indicated by a slight dip 520 of the motion of the piston at the flat-top portion. The dip in the near flat-top portion 545 can be used to smoothly couple to other portions of the piston motion. The dip 520 in the flat portions of the piston motion can be a few percents of the total stroke of the piston, for example, less than 10%, or can be less than 5% or 3% of the total stroke of the piston.

In some embodiments, the flat portions of the piston motion can be a small portion of the piston period. For example, the flat-top portion 510 or the flat-bottom portion can be a few percents of the piston cycle, such as less than 20%, less than 15%, less than 10% or less than 5% of the piston cycle. For example, if the piston cycle is 360°, e.g., a complete cycle of the piston from TDC position to BDC position back to TDC position corresponds to a full 360° rotation of the camshaft, the flat-top portion or the flat-bottom portion can be less than 36° (10%), less than 30° (less than 10%), or less than 25° (less than 10%).

In some embodiments, the piston motion can have a flat-top portion, a near flat top portion, a flat-bottom portion, a near flat bottom portion, or both flat-top and flat-bottom portions or near flat top and near flat bottom portions. The flat-top portion can be the same, similar, or different from the flat-bottom portion. FIG. 5B shows a flat-top piston motion 550, including only a flat-top 552 without any flat-bottom. FIG. 5C shows a flat-top and flat-bottom piston motion 560, including a flat-top 562 and a flat-bottom 564.

In some embodiments, the present invention discloses a radial cam engine with a cam geometry or profile configured to exhibit a flat-top (or near flat-top) and/or flat-bottom (or near flat-bottom) portion of the piston motion. The flat- or near flat-top and/or bottom of the piston motion can be configured to encompass the combustion process, resulting in improved power transfer and improved performance for the radial cam engine.

In some embodiments, the camshaft rotation corresponded to a piston cycle can be modified, for example, to improve the performance of the radial cam engine. In a crankshaft engine, a piston cycle corresponds to a full 360° rotation of the crankshaft. A two-stroke combustion cycle corresponds to a piston cycle, so a two-stroke combustion cycle corresponds to 360° rotation of the crankshaft. A four-stroke combustion cycle corresponds to two piston cycle, so a four-stroke combustion cycle corresponds to 720° rotation of the crankshaft or two full circles. The active portion of the combustion cycle can be related to the expansion phase, which typically accounts for about one quarter of the combustion cycle. The other three-quarters of the combustion cycle are passive portion, using the power generated by the active portion to complete the combustion cycle.

In some embodiments, the radial cam engine can employ a cam geometry or profile that can change the amount of rotation of the camshaft. For example, a one-lobe cam can correspond to 360° rotation for a full cycle of the piston. A two-lobe cam can correspond to half the rotation, e.g., 180° rotation for a full cycle of the piston. A three-lobe cam can correspond to one third of the rotation, e.g., 120° rotation for a full cycle of the piston. The amount of rotation can be directly related to the number of lobes in the cam profile. The shortening of the rotation amount can allow an improvement in performance, e.g., by using less fuel in a combustion phase to rotate a less amount of camshaft rotation.

FIGS. 6A-6E illustrate a piston cycle corresponded to various cam profiles according to some embodiments. A full cycle of the piston motion can include the piston motion 660, starting at a middle position (0 degree), moving up to the TDC position, staying at the TDC position for a flat portion 650 of the cycle, then moving down to the BDC position, staying at the BDC position for a portion of the cycle, then move back up to the middle position, e.g., the starting position. In some embodiments, a combustion cycle can start at the beginning 662 of the flat portion 650, and can end at the end 664 of the flat portion 650. The active phase of the combustion cycle can be the combustion phase 650, from the ignition time 662 to the complete fuel burning time 664. The remaining phase can be passive phase, using the power generated by the active phase to return the piston to the beginning of the active phase.

FIG. 6E shows a one-lobe cam, together with one piston assembly. A full cycle of the piston motion can correspond to a full 360° rotation of the one-lobe cam. FIG. 6D shows a two-lobe cam, together with two piston assemblies. A full cycle of each piston motion can correspond to a 180° rotation of the two-lobe cam. FIG. 6C shows a three-lobe cam, together with three piston assemblies. A full cycle of each piston motion can correspond to a 120° rotation of the three-lobe cam. FIG. 6B shows a four-lobe cam, together with four piston assemblies. A full cycle of each piston motion can correspond to a 90° rotation of the four-lobe cam. In these cam configurations, multiple piston assemblies can also be used. Further, more than 4 lobes can also be used, such as 5 or 10 lobe cams. Also, the cams shown are symmetric, but non-symmetrical configurations can be used.

In some embodiments, the multiple lobe cams can provide high power density for the radial cam engine, due to the multiple combustion phases per full circle rotation. For example, a piston coupled with a three-lobe cam can undergo combustion phase once per every 120°, thus can have three times the power density of a 2-stroke crankshaft engine.

In some embodiments, the present invention discloses a radial cam engine with a multiple lobe cam geometry or profile. The multiple lobe cam can be configured to improve a power density of the radial cam engine, and/or to improve a performance of the radial cam engine.

In some embodiments, high power density can be accomplished with multiple piston/cylinder assemblies. The piston/cylinder assemblies can be placed in equal spacing around 360° for single lobe or multiple lobe cams, or can be placed in equal spacing around 360°/n for n-multiple lobe cams.

Figure 7A:
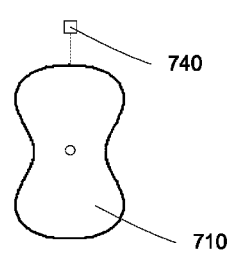
FIGS. 7A-7F illustrate various piston/cylinder assemblies for a double lobe cam according to some embodiments.
Figure 7D:
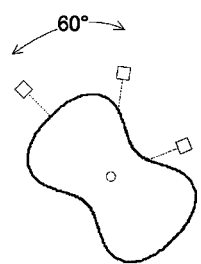
Figure 7B:
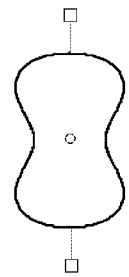
Figure 7E:
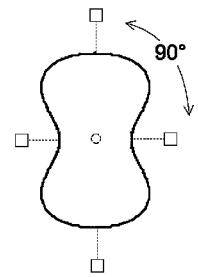
Figure 7C:
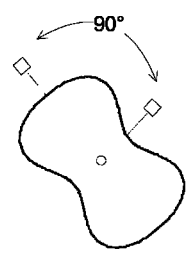
Figure 7F:
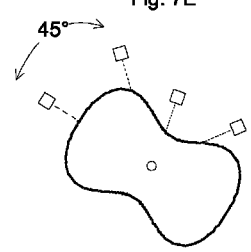

FIGS. 7A-7F illustrate various piston/cylinder assemblies for a double lobe cam according to some embodiments. The number of lobes in the cam in these figures is n=2. In FIG. 7A, one piston/cylinder assembly 740 can be used with a double lobe cam 710. In FIG. 7B, two piston/cylinder assemblies can be used with a separation of 180° between the two piston/cylinder assemblies (e.g., the piston/cylinder assemblies span an arc of $2\pi$). The two piston/cylinder assemblies can be fired at the same time. In FIG. 7C, two piston/cylinder assemblies can also be used with a separation of 90° between the two piston/cylinder assemblies (e.g., the two piston/cylinder assemblies span an arc of $2\pi/n=2\pi/2=\pi$). Since the cam is double lobe, the 90° separation of the two piston/cylinder assemblies can provide a force on the cam for every 90° rotation, e.g., one piston/cylinder assembly can be fired after 90° rotation after the firing of the other piston/cylinder assembly. In FIG. 7D, three piston/cylinder assemblies can also be used with a separation of 60° between the two piston/cylinder assemblies (e.g., the three piston/cylinder assemblies span an arc of $2\pi/n=\pi$). One piston/cylinder assembly can be fired after 60° rotation after the firing of the previous piston/cylinder assembly. In FIG. 7E, four piston/cylinder assemblies can be used with a separation of 90° between the two piston/cylinder assemblies. The four piston/cylinder assemblies can be fired at the same time. In FIG. 7F, four piston/cylinder assemblies can also be used with a separation of 45° between the two piston/cylinder assemblies (e.g., the four piston/cylinder assemblies span an arc of $2\pi/n=\pi$). One piston/cylinder assembly can be fired after 45° rotation after the firing of the previous piston/cylinder assembly.

Other numbers of piston/cylinder assemblies can be used, for example, 5 piston/cylinder assemblies can be placed in half a circle with 36° separation between each pair of piston/cylinder assemblies (e.g., the five piston/cylinder assemblies span an arc of $2\pi/n=\pi$). Other cams with different numbers of lobes can be used. For example, 3 piston/cylinder assemblies can be placed in a circle with 120° separation between each pair of piston/cylinder assemblies, or can be placed in a 120° arc with 40° separation between each pair of piston/cylinder assemblies (e.g., three two piston/cylinder assemblies span an arc of $2\pi/3=2\pi/3=120°$).

In addition, multiple piston/cylinder assemblies can be in one or more lobes arc section of the multiple lobe cam. For example, 6 piston/cylinder assemblies can be placed in a 120° arc for a three-lobe cam with 20° separation between each pair of piston/cylinder assemblies, which corresponds to the arc span of a lobe in the three-lobe cam (e.g., the six piston/cylinder assemblies span an arc of $2\pi/n=2\pi/3=120°$). Alternatively, the 6 piston/cylinder assemblies can be placed in a 240° arc of the three-lobe cam with 40° separation between each pair of piston/cylinder assemblies, which corresponds to the arc span of two lobes in the three-lobe cam (e.g., the six piston/cylinder assemblies span an arc of $2\pi*m/n=2\pi*2/3=240°$, with n being the number of lobes of the cam, and m being the number of lobes that the piston/cylinder assemblies are arranged).

In some embodiments, the present invention discloses a radial cam engine with a multiple lobe cam geometry or profile with multiple piston/cylinder assemblies arranged in a portion of the complete circle. The multiple lobe cam and the multiple piston/cylinder assemblies can be configured to improve a power density of the radial cam engine, and/or to improve a performance of the radial cam engine.

In some embodiments, the piston motion can be modified to provide zero, or close to zero, force at TDC and/or BDC positions. The force is directly proportional to the acceleration, thus a lower, or zero, force at the TDC position can prolong, or reduce, the movement of the piston from the TDC position. The slow movement of the piston at the TDC position can aid in the constant volume transition of the combustion phase, which can improve the performance of the combustion engine. The zero force or acceleration at the TDC position can also minimize the loss in power transfer from the piston to the rotating shaft, since the rotating shaft can have zero torque at the TDC position.

In some embodiments, the cam geometry or profile in a radial cam engine can be modified to provide a piston motion that can exhibit zero acceleration at TDC position. For example, the piston motion near the TDC position can have $x^3$ or higher polynomial dependency, thus having x or higher polynomial dependency for the acceleration. Piston motion having $x^2$, sine or cosine dependency can exhibit non-zero acceleration at TDC position, which can reduce power transfer and performance of the combustion engine.

Further, the cam geometry or profile in a radial cam engine can be modified to provide a piston motion that can exhibit an acceleration profile that can match with a power transfer from the piston to the rotating shaft, at least in the combustion and/or expansion phase. The matching profiles can minimize power loss, ensuring that the power generated by the combustion cycle from the piston can be transferred to the rotating torque of the rotating shaft.

Figure 8A:
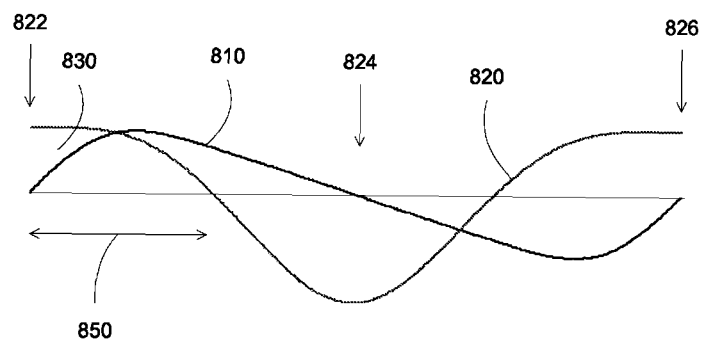
FIGS. 8A-8B illustrate acceleration and power transfer profiles for a crankshaft engine according to some embodiments.
Figure 8B:
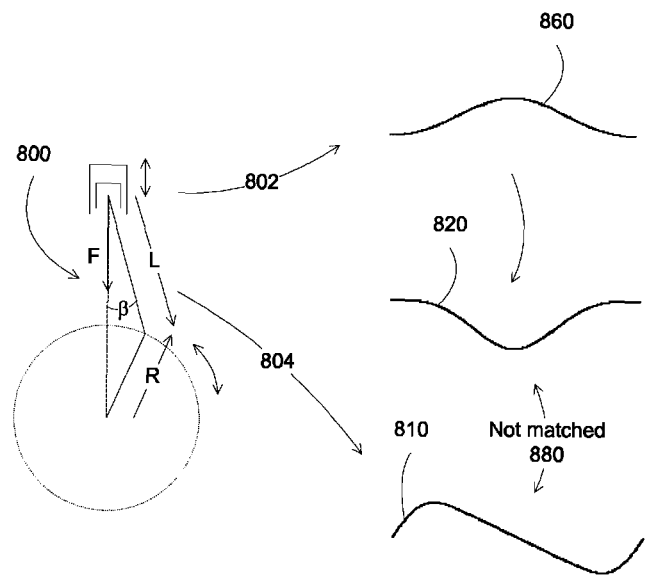

FIGS. 8A-8B illustrate acceleration and power transfer profiles for a crankshaft engine according to some embodiments. In FIG. 8A, an acceleration curve 820 for a crankshaft engine is shown, starting from the TDC position 822 to the BDC position 824 back to the TDC position 826. The acceleration curve 820 can be calculated from the piston motion according to equation (1). Since the piston motion has a cosine shape, the acceleration 820 also has a cosine shape, e.g., maximum acceleration at TDC positions 822 and 826. During the period 850, which is the combustion phase in which the explosion drives the piston downward, the acceleration, which is proportional to the force on the piston, is positive. About half way down the piston stroke, e.g., passing the period 850, the acceleration changes sign, e.g., acting as a brake to slow down the piston. The crankshaft momentum drives the piston toward the BDC position 824, and then return to the TDC position 826.

Also shown in FIG. 8A is the torque transfer curve 810, which is the ratio T/F between the torque T acting on the crankshaft and the force F from the piston:

$$T = \vec{R} \times (\vec{F} \cdot \vec{L}) \frac{\vec{L}}{|\vec{L}|}$$

When the piston is at TDC and BDC positions 822, 824 and 826, the ratio T/F is zero. Thus the high force at the TDC position 822 does not transfer to the crankshaft, resulting in a power loss 830.

FIG. 8B shows the configuration of a crankshaft engine 800. The crankshaft configuration limits the motion of the piston, and the piston motion 860 can be derived 802 from the lengths L and R of the connecting rod and the crank, respectively. The acceleration 820, which is related to the force, can be derived from the piston motion.

At the same time, the crankshaft configuration limits the transfer of the force to the crankshaft torque. The ratio 810 of torque and force can be derived 804 also from the lengths L and R of the connecting rod and the crank. The difference 880 between the acceleration/force 820 and the torque/force ratio 810 can cause significant power loss, e.g., unmatched portion 830.

Figure 9A:
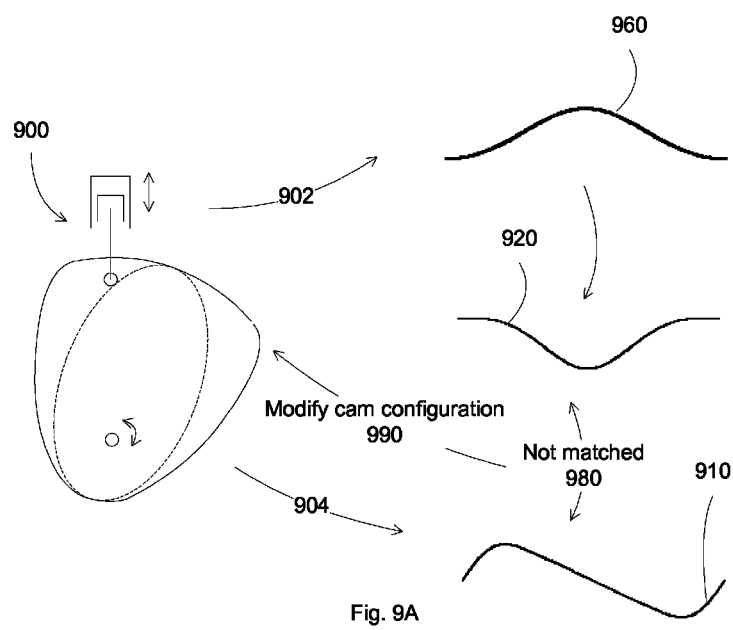
FIGS. 9A-9B illustrate acceleration and power transfer profiles for a camshaft engine according to some embodiments.
Figure 9B:
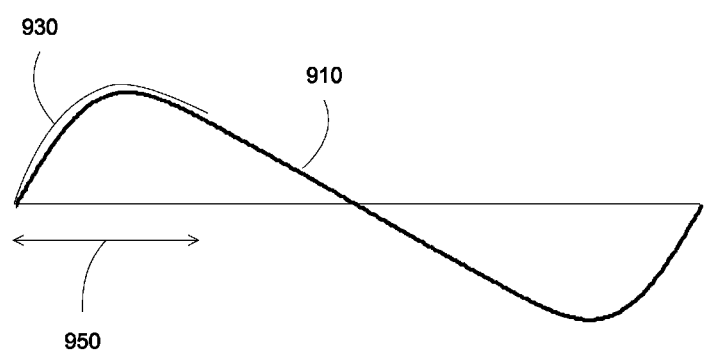

FIGS. 9A-9B illustrate acceleration and power transfer profiles for a camshaft engine according to some embodiments. In FIG. 9A, a configuration of a camshaft engine 900 is shown. The camshaft geometry can dictate the motion of the piston, and the piston motion 960 can be derived 902 from the radius of the cam as a function of the cam angle. The acceleration 920, which is related to the force, can be derived from the piston motion.

At the same time, the camshaft configuration can be used to calculate the transfer of the force to the camshaft torque. The ratio 910 of torque and force can be derived 904 also from the cam geometry and the relative piston position. If there is any difference 980 between the acceleration/force 920 and the torque/force ratio 910, the cam geometry or profile, e.g., the cam radius as a function of the cam angles, can be modified until a match is found.

FIG. 9B shows the matched profiles between the acceleration/force 930 and the torque/force ratio 910, at least in the combustion and/or explosion phase 950. The acceleration 930 can start at zero at the TDC position, rise to a maximum value, and then slowly reduce. The contour of the acceleration curve 930 can be similar to the contour of the torque/force ratio 910.

Figure 10A:
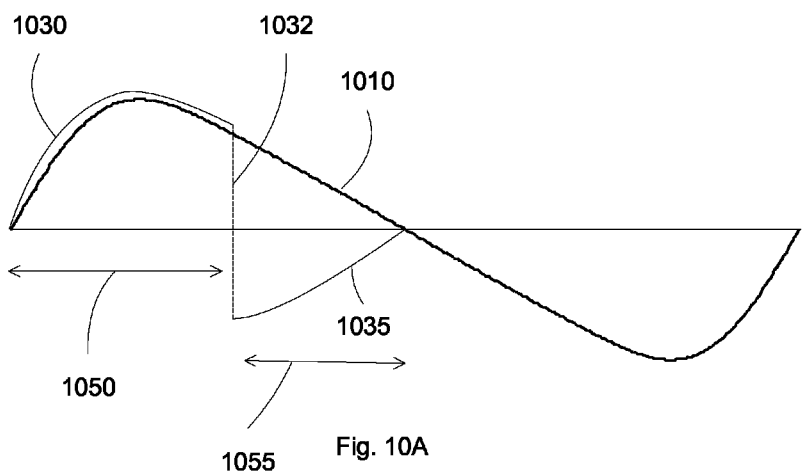
FIGS. 10A-10B illustrate various matched profiles of cam configurations according to some embodiments.
Figure 10B:
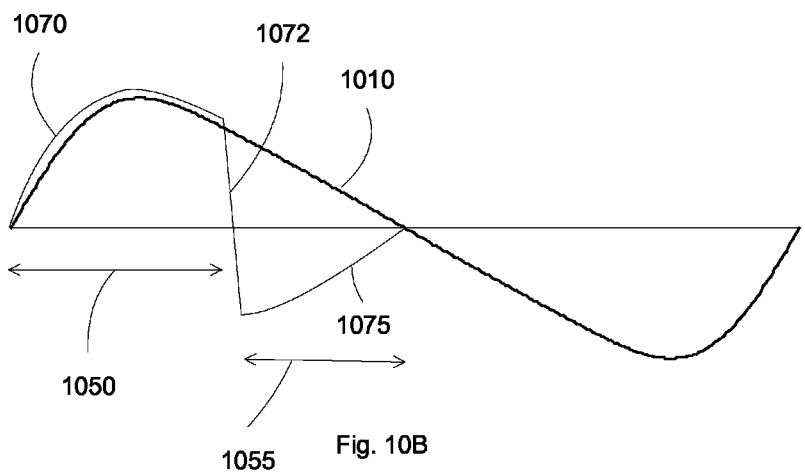

FIGS. 10A-10B illustrate various matched profiles of cam configurations according to some embodiments. In FIG. 10A, the acceleration curve 1030 can match the torque/force ratio curve 1010 during the combustion phase 1050. During the slowing down portion 1055 of the piston, e.g., from about middle of the piston stroke to the BDC position, the acceleration can change abruptly 1032, and then slowly approach 1035 zero at the BDC position. In FIG. 10B, the acceleration curve 1070 can match the torque/force ratio curve 1010 during the combustion phase 1050. During the slowing down portion 1055 of the piston, e.g., from about middle of the piston stroke to the BDC position, the acceleration can gradually change 1072, and then slowly approach 1075 zero at the BDC position. The gradual change of the acceleration can reduce the jerkiness of the piston, which can improve the reliability of the radial cam engine. As shown, there can be sharp changes between different portion of the acceleration curve, e.g., between curve 1070 and 1072, between curve 1072 and 1075. Smooth changes can also be accomplished, which can further reduce the jerk of the piston.

In some embodiments, the present invention discloses a radial cam engine with a cam geometry or profile configured to exhibit a match between the acceleration of the piston with the torque/force ratio, at least in the combustion and/or explosion phase, e.g., from the TDC position to about half way to the BDC position of the piston. For example, the cam geometry or profile can be such that the piston motion includes a polynomial portion of degree three or higher at the TDC area. Since the piston motion and the cam radius are related, for example, by equation (2) for a piston passing through the center of the cam, or by other equations relating the piston motion with the cam radius, a piston motion can be achieved through the proper cam selection.

In some embodiments, the piston motion can be configured so that there can be longer time for the combustion or explosion phase of the combustion process. In addition, the piston motion can be configured so that there can be higher force at the combustion or explosion phase of the combustion process. For example, in the piston motion, the portion from the TDC position to the inflection point between reaching the BDC position can provide a positive force pushing the camshaft, which can correspond to the combustion or explosion phase. The portion from the inflection point to the BDC position can provide a negative force pulling the camshaft, acting as a brake for the piston motion. Thus the time or distance from the TDC position to the inflection point can be configured to be longer than the time or distance from the inflection point to the BDC position. This can increase the portion of the active power transfer from the piston to the camshaft. In addition, the force from the TDC position to the inflection point can be configured to be higher than the force from the inflection point to the BDC position. This can increase the active power transfer from the piston to the camshaft.

In some embodiments, a force or an acceleration can be designed with longer combustion time and/or higher value than the other portion of the force curve. A double integral of the force or acceleration can provide the motion of the piston that is asymmetric, with a higher weight toward the active phase as compared to the passive phase of the piston movement. The combustion time can be about less than about 50%, 40%, 30%, 20%, or 10% longer, as compared to a symmetric piston motion. For example, in a symmetric piston motion that corresponds to a 180° rotation of the camshaft, e.g., in a double lobe cam configuration, can be 180°/4=45°. In some embodiments, the asymmetric piston motion can have about 30%, 20%, or 10% longer than 45°. The force value can be about less than about 50%, 40%, 30%, 20%, or 10% higher, as compared to a symmetric piston motion. For example, in a symmetric piston motion, the force pushing the camshaft due to the combustion action can be equal to the force pulling the camshaft for slowing down the piston. In some embodiments, the asymmetric piston motion can have about 30%, 20%, or 10% higher force or acceleration at the TDC position as compared to the BDC position.

Figure 11A:
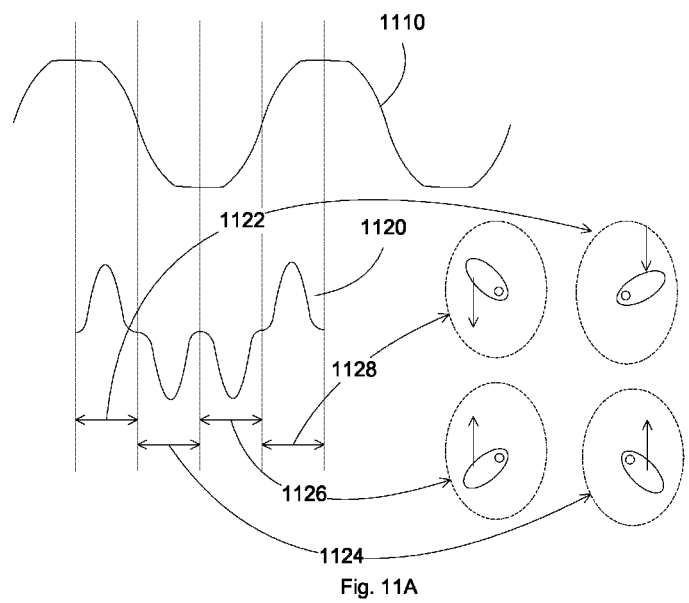
FIGS. 11A-11C illustrate symmetric and asymmetric piston motions according to some embodiments.
Figures 11B, 11C:
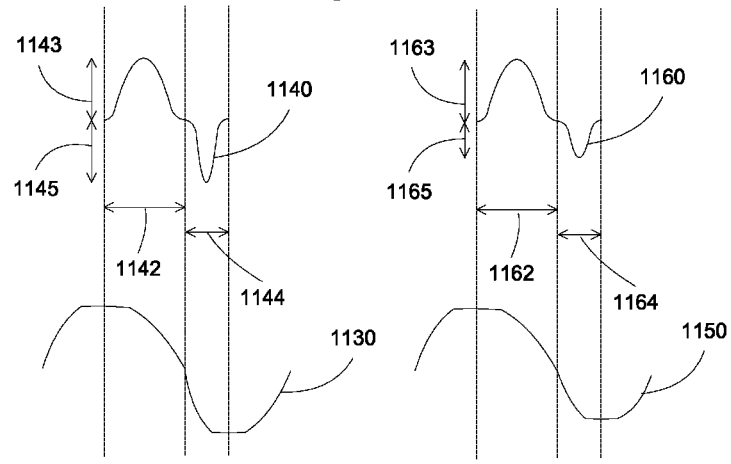

FIGS. 11A-11C illustrate symmetric and asymmetric piston motions according to some embodiments. In FIG. 11A, a symmetric piston motion 1110 is shown, which corresponds to an acceleration or force 1120. The piston motion 1110 is symmetric, meaning the four phases of the piston force have equal length and magnitude. In phase 1122, which corresponds to a combustion phase, the explosion pushes the piston downward, which in turn, active pushing the camshaft. In phase 1124, which corresponds to an exhaust phase, the momentum continues to rotate the camshaft, with a negative force acting on the piston to slow down the piston so that the piston can turn around passing the BDC position. In phase 1126, which corresponds to a charging or intake phase, the momentum continues to rotate the camshaft, with a negative force acting on the piston to push the piston upward. In phase 1128, which corresponds to a compression phase, the momentum continues to rotate the camshaft, with a positive force acting on the piston to slow down the piston so that the piston can turn around passing the TDC position. The figure corresponds to a single lobe cam, which rotates 360° for every cycle of the piston motion. Further, the figure corresponds to a 2-stroke combustion process, with a combustion phase per cycle of the piston motion. The figure serves to provide a simple explanation for the different phases or regions of the piston motion. The validity of the present invention is not limited by the described explanation, but that the invention has the full scope defined by the language of the following claims, and equivalents thereof.

Actions for multiple lobe cams and a four stroke process can be similar. In general, the asymmetry is related to the sign of the force acting on the piston, and the torque on the cam shaft due to the piston force. The phases are then related to the durations that the force changes sign, e.g., from pushing down the piston for actively rotating the camshaft (in combustion cycle), to pulling back the piston for slowing down the piston and pulling the camshaft backward. The phases can be related to the durations that the actions on the camshaft change nature, e.g., from actively rotating the camshaft in the combustion phase, to the conservation of momentum carrying the camshaft rotation, with the braking action of the piston to slow down the piston.

In FIG. 11B, an asymmetric force or acceleration 1140 for a piston motion 1130 is shown with a longer combustion phase 1142 as compared to an exhaust phase 1144. The asymmetric acceleration 1140 can be constructed with similar magnitudes 1143 and 1145 for the combustion and exhaust phases 1142 and 1144, and with longer combustion phase 1142 than the exhaust phase 1144. The magnitudes 1143 and 1145 of the acceleration, together with the durations 1142 and 1144 of the phases can be designed to optimize the radial cam engine, for example, to improve the performance, to reduce fuel consumption, or to increase the power density. The piston motion 1130 can be derived from the acceleration 1140, for example, by a double integration of the acceleration, with proper boundary conditions.

In FIG. 11C, an asymmetric force or acceleration 1160 for a piston motion 1150 is shown with a longer combustion phase 1162 as compared to an exhaust phase 1164. The asymmetric acceleration 1160 can be constructed with higher magnitude 1163 in the combustion phase 1162 than the magnitude 1165 at of the exhaust phase 1164, and with longer combustion phase 1162 than the exhaust phase 1164. The magnitudes 1163 and 1065 of the acceleration, together with the durations 1162 and 1164 of the phases can be designed to optimize the radial cam engine, for example, to improve the performance, to reduce fuel consumption, or to increase the power density. The piston motion 1150 can be derived from the acceleration 1160, for example, by a double integration of the acceleration, with proper boundary conditions.

Other asymmetric piston motion can be used, such as asymmetric force magnitudes with similar durations for the combustion and exhaust phases, e.g., higher magnitude and similar duration for the combustion phase as compared to lower magnitude and similar duration for the exhaust phases.

Figure 12A:
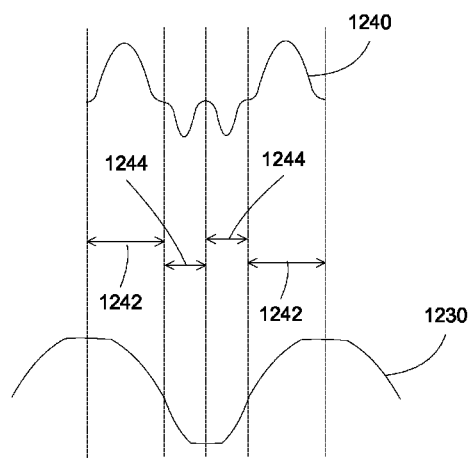
FIGS. 12A-12B illustrate various asymmetric piston motions for a complete piston cycle according to some embodiments.
Figure 12B:
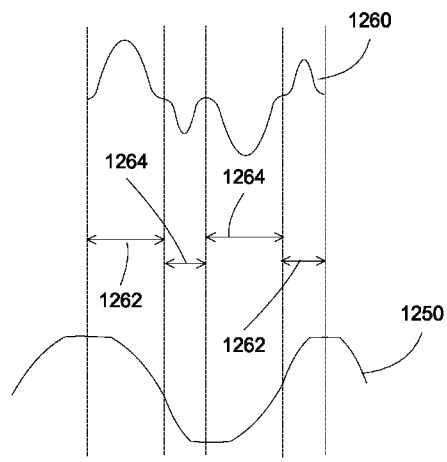

FIGS. 12A-12B illustrate various asymmetric piston motions for a complete piston cycle according to some embodiments. In FIG. 12A, an asymmetric piston acceleration or force 1220 is shown, which corresponds to a motion 1230. The piston motion 1230 is asymmetric, meaning the four phases of the piston force have different lengths and magnitudes. In phase 1242, which corresponds to a combustion phase, the force magnitude and duration is high, for example, to improve a power transfer from the combustion process to the rotation of the camshaft. In phase 1244, which corresponds to an exhaust phase, the force magnitude and duration is low, for example, to minimize the braking power and duration imposed on the piston. In phase 1246, which corresponds to a charging phase, the force magnitude and duration is similar to those of the exhaust phase, for example, to be somewhat symmetric with respect to the exhaust phase. In phase 1248, which corresponds to a compression phase, the force magnitude and duration is similar to those of the combustion phase, for example, to be somewhat symmetric with respect to the combustion phase.

In FIG. 12B, an asymmetric force or acceleration 1260 for a piston motion 1250 is shown with a longer combustion phase 1262 and higher force magnitude as compared to an exhaust phase 1264. In phase 1262, which corresponds to a combustion phase, the force magnitude and duration is high, for example, to improve a power transfer from the combustion process to the rotation of the camshaft. In phase 1264, which corresponds to an exhaust phase, the force magnitude and duration is low, for example, to minimize the braking power and duration imposed on the piston. In phase 1266, which corresponds to a charging phase, the force magnitude and duration is similar to those of the combustion phase, for example, to improve a power transfer to the rotation of the camshaft. In phase 1268, which corresponds to a compression phase, the force magnitude and duration is similar to those of the exhaust phase, for example, to minimize the braking power and duration imposed on the piston. Other asymmetric piston motion can be used, such as asymmetric force magnitudes and/or asymmetric durations for all four phases.

In some embodiments, the present invention discloses a radial cam engine with a cam geometry or profile configured to exhibit an asymmetric piston motion and/or acceleration. For example, the cam geometry or profile can be such that the piston acceleration is higher and/or longer during the combustion phase as compared to those of at least another phase, such as the exhaust phase. The asymmetry of the piston motion and/or acceleration can also be extended to the charging and compression phases.

In some embodiments, the positions of the piston/cylinder assembly and the camshaft can be configured so that there can be higher power transfer from the combustion or explosion phase of the combustion process to the camshaft. For example, the piston can be placed in line with the rotational center of the camshaft, e.g., the connection rod of the piston can pass through the center of the camshaft. Alternatively, the piston can be placed with an offset to the camshaft center of rotation. If the piston offset is positive, e.g., offsetting toward the rotation of the cam during the combustion phase, higher torque transfer can be achieved during the combustion phase, which can improve the power transfer of the combustion process.

Figure 13A:
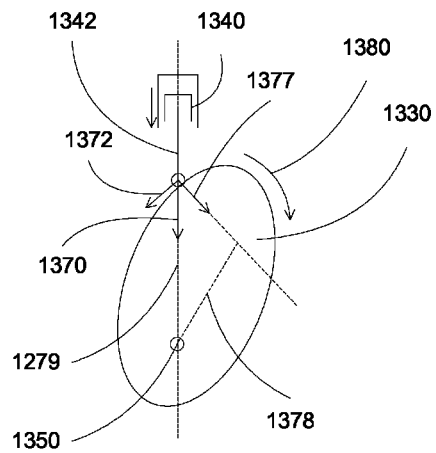
FIGS. 13A-13B illustrate a configuration of the piston and camshaft according to some embodiments.
Figure 13B:
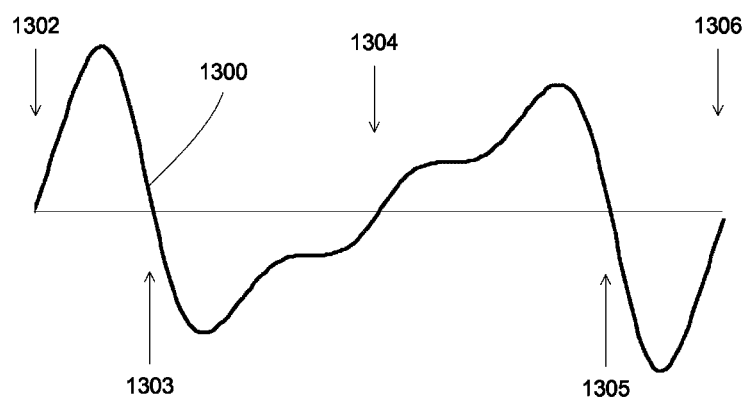

FIGS. 13A-13B illustrate a configuration of the piston and camshaft according to some embodiments. In FIG. 13A, a piston 1340 is coupled to a single lobe cam 1330, which can rotate around a rotational center 1350. A connection rod 1342 can be fixed coupled at one end to the piston, and movingly coupled at an opposite end to the cam 1330. The connection rod 1342 can pass through the rotational center 1350. When the piston moves down, for example, during the combustion or explosion phase, the piston exerts a force 1370 to the cam, at the coupling between the connection rod and the cam. Since the connection rod passes through the rotational center 1350, the force 1370 also directs toward the rotational center 1350. The decomposition of the force 1370 can provide a tangent force 1372 and a normal force 1377. The tangent force 1372 is tangent to the cam surface at the point of contact, e.g., at the point of coupling between the connection rod and the cam. The tangent force 1372 can drive the coupling point along the cam surface. The normal force 1377 is normal to the tangent force 1372, and can exert a rotational torque to the cam around the rotational center 1350. The torque can be the cross product of the normal force 1377 and the cam radius 1379 (which is a vector from the rotational center 1350 to the point of coupling), or a product of the normal force 1377 and the perpendicular length 1378. The torque exerted on the cam due to the force 1370 can rotate the cam in a direction 1380 around the center of rotation 1350.

In FIG. 13B, the torque/force ratio 1300 is shown, which corresponds to the zero offset configuration of a piston and cam, e.g., the connection rod passing through the rotational center. A full cycle of the piston motion is shown, starting from the TDC position 1302, to the BDC position 1304, and back to the TDC position 1306. The force changes sign at the inflection point 1303 while the torque remains at the same sign, thus the torque/force ratio also changes sign at the inflection point 1303. The force remains the same sign at the BDC position 1304 while the torque changes sign, thus the torque/force ratio changes sign again at the BDC position 1304. The force changes sign again at the inflection point 1305 while the torque remains at the same sign, thus the torque/force ratio also changes sign at the inflection point 1305.

As shown, the portion of the piston movement between the TDC 1302 and the inflection 1303 can correspond to the combustion or explosion phase of the combustion process, which can be the active power transfer phase from the piston to the camshaft. At other portions, e.g., from the inflection point 1303 to TDC position 1306, the camshaft rotation drives the piston movement. Thus in some embodiments, maximizing the torque/force ratio at the combustion phase can lead to an improvement of power transfer in a camshaft combustion engine.

Figure 14A:
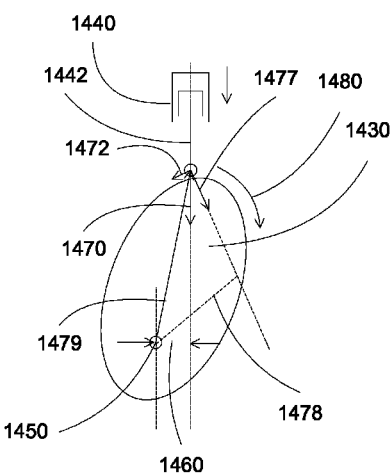
FIGS. 14A-14B illustrate another configuration of the piston and camshaft according to some embodiments.
Figure 14B:
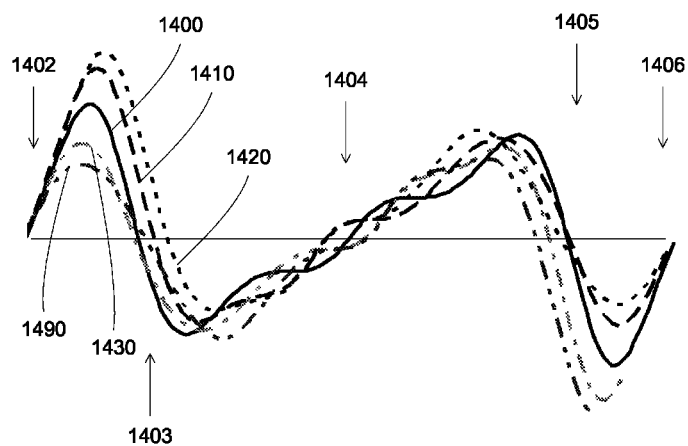

FIGS. 14A-14B illustrate another configuration of the piston and camshaft according to some embodiments. In FIG. 14B, a piston 1440 is coupled to a single lobe cam 1430, which can rotate around a rotational center 1450. A connection rod 1442 can be fixed coupled at one end to the piston, and movingly coupled at an opposite end to the cam 1430. The connection rod 1442 can be offset an offset distance 1460 with respect to the rotational center 1450. When the piston moves down, for example, during the combustion or explosion phase, the piston exerts a force 1470 to the cam, at the coupling between the connection rod and the cam. The force 1470 is offset a same offset distance with the rotational center 1450. The decomposition of the force 1470 can provide a tangent force 1472 and a normal force 1477. The tangent force 1472 is tangent to the cam surface at the point of contact, e.g., at the point of coupling between the connection rod and the cam. The tangent force 1472 can drive the coupling point along the cam surface. The normal force 1477 is normal to the tangent force 1472, and can exert a rotational torque to the cam around the rotational center 1450. The torque can be the cross product of the normal force 1477 and the cam radius 1479 (which is a vector from the rotational center 1450 to the point of coupling), or a product of the normal force 1477 and the perpendicular length 1478. The torque exerted on the cam due to the force 1470 can rotate the cam in a direction 1480 around the center of rotation 1450. As shown, the offset distance 1460 can be positive since it is offset toward the rotational direction 1480 during a combustion phase of the piston.

In FIG. 14B, various torque/force ratios 1400, 1410, 1420, 1430, and 1490 are shown, which corresponds to different offset values configuration of a piston and cam. A full cycle of the piston motion is shown, starting from the TDC position 1402, to the BDC position 1404, and back to the TDC position 1406. The shapes of the torque/force ratio curves are similar, e.g., changing sign at the inflection point 1403, changing sign again at the BDC position 1404, and changing sign at the inflection point 1405.

As shown, the portion of the piston movement between the TDC 1402 and the inflection 1403 can correspond to the combustion or explosion phase of the combustion process, which can be the active power transfer phase from the piston to the camshaft. At other portions, e.g., from the inflection point 1403 to TDC position 1406, the camshaft rotation drives the piston movement.

As shown, curve 1400 corresponds to a zero offset value, e.g., the connection rod passing through the rotational center 1450. Curves 1410 and 1420 correspond to increasingly positive offset ratios, which can shift the inflection point 1403 to form a longer positive power transfer. Curves 1430 and 1490 correspond to increasingly negative offset ratios, which can shift the inflection point 1403 to form a shorter positive power transfer. Thus curve 1420 can have higher power transfer of the torque/force ratio at the combustion phase, which can lead to an improvement of power transfer in a camshaft combustion engine.

In some embodiments, the present invention discloses a radial cam engine with a piston assembly offset from a camshaft, which is configured to exhibit a higher power transfer of torque/force ratio during the combustion phase. For example, the piston offset can be such that the duration from the TDC position to the inflection point is longer during the combustion phase as compared to those of at least another phase, such as the exhaust phase. The offset value can be positive, e.g., to lengthen the duration of the combustion phase. The offset values can be less than the minimum radius of the cam, or less than 80%, 60%, 50%, 40%, 30%, 20%, or 10% of the minimum radius of the cam, depending on other optimization criteria.

In some embodiments, the radial cam engines can be used in a vehicle or in a motorized machine. For example, the radial cam engine can be used in a hybrid vehicle, with each hybrid vehicle having an electrical motor and a radial cam engine. The electrical motor can be used at low speed or at stop-and-go speed, such as in city driving or in local traffic. The electrical motor can be optimized for high torque and high acceleration with low speed traveling. The radial cam engine can be used in high speed or in stead speed, such as in long distance driving or in highway speed. The radial cam engine can be optimized for high performance, such as low fuel consumption and maximal power generation. For example, the cam in a radial cam engine can be designed to maximize a power transfer from the combustion process to the piston linear movement, to maximize a power transfer from the piston linear movement to the camshaft rotation, to maximize a matching power transfer between the force on the piston and the torque on the camshaft, to maximize a power ratio between the explosion phase and the compression/expansion phases of the combustion cycles.

Figure 15A:
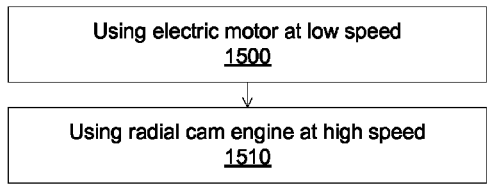
FIGS. 15A-15D illustrate flowcharts for driving an electric vehicle having a radial cam engine according to some embodiments.

FIGS. 15A-15D illustrate flowcharts for driving an electric vehicle having a radial cam engine according to some embodiments. In FIG. 15A, operation 1500 provides an operation of an electric vehicle by an electric drive system at low speed, such as in local streets or in acceleration mode. Operation 1510 engages the radial cam engine power train to move the vehicle at high speed, such as in long distance driving, or in steady speed in highway conditions. The radial cam engine can be configured for optimal performance at high speed, including low torque operation. The radial cam engine can run on gasoline. In some embodiments, the radial cam engine can run on natural gas, hydrogen or fuel cell to provide a clean energy vehicle.

Figure 15B:
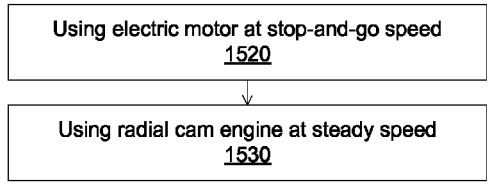

In FIG. 15B, operation 1520 provides an operation of an electric vehicle by an electric drive system in stop-and-go speed, such as in local streets. Operation 1530 switches from the electric drive to a radial cam engine to drive at steady speed, such as for long distance in highway conditions. The radial cam engine can be configured for optimal performance at steady speed, including low torque operation. The radial cam engine can run on gasoline. In some embodiments, the radial cam engine can run on natural gas, hydrogen or fuel cell to provide a clean energy vehicle.

Figure 15C:
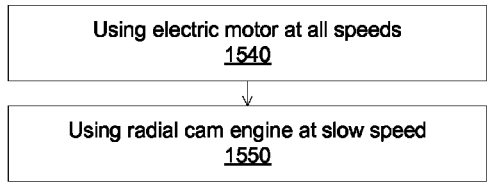

In FIG. 15C, operation 1540 provides an operation of an electric vehicle by an electric drive system at all speeds. For example, the hybrid vehicle can use the electric drive for local streets, for highways, for stop-and-go, for acceleration mode, for slow speed, for high speed, and for steady speed. Operation 1550 switches from the electric drive to a radial cam engine to drive at a slow speed, such as for emergency driving to a charging station when the battery is running out. The radial cam engine can be a small engine, which is configured for slow speed and/or short distance, for example, mainly for emergency purposes. The radial cam engine can be configured for optimal performance at low speed, including low torque operation. For example, the radial cam engine can be small and light weight, which can be included in the hybrid vehicle as an emergency power source, for example, to assist the operation of the hybrid vehicle when the battery is depleted. The radial cam engine can run on gasoline. In some embodiments, the radial cam engine can run on natural gas, hydrogen or fuel cell to provide a clean energy vehicle.

Figure 15D:
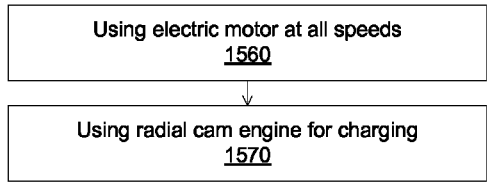

In FIG. 15D, operation 1560 provides an operation of an electric vehicle by an electric drive system at all speeds. For example, the hybrid vehicle can use the electric drive for local streets, for highways, for stop-and-go, for acceleration mode, for slow speed, for high speed, and for steady speed. Operation 1570 turns on a radial cam engine for charging a battery of the hybrid vehicle. The radial cam engine can run at high and steady speed to charge the battery. The radial cam engine can be a small engine, which is configured for charging at a constant speed during the operation of the hybrid vehicle using the electric drive. The radial cam engine can be configured for optimal performance at steady speed. For example, the radial cam engine can be small and light weight, which can be included in the hybrid vehicle as an electrical generator, for example, to charge the battery of the hybrid vehicle. The radial cam engine can run on gasoline. In some embodiments, the radial cam engine can run on natural gas, hydrogen or fuel cell to provide a clean energy vehicle.

Other configurations can be used, depending on the requirements and the performance of the radial cam engine.

In some embodiments, the present invention discloses electric vehicles and methods to operate such vehicles. The electric vehicle can include an electric drive capable of moving the vehicles, together with a non-electrical feature to enhance the performance of the vehicle, such as extending the range or increasing the power. In the present description, "electrical" sometimes means "battery", and "non-electrical" sometimes means "non-battery". The electric drive can be powered by the battery, and the non-electrical feature can be powered by non-electrical power (or non-battery power), such as by natural gas, gasoline or diesel, compressed air, solar panel, or other power sources. The non-electrical enhanced feature can be independent and not integrated with the electric drive, to enable the return of the vehicle design to pure electrical power with minimum modification. In some embodiments, the non-electrical feature can be coupled only with the electric drive at the start-stop level, such as a manual or automatic switch that turns on or off the enhanced feature, so that the enhanced feature can operate in addition, or in replacement, of the electric drive. In some embodiments, the non-electrical feature can include a radial cam engine as described above, using a combustible fuel such as gasoline, diesel, natural gas, or hydrogen.

In some embodiments, the non-electrical enhanced feature can include at least one of a non-electric drive coupled to a free (e.g., an axle that is not powered by the electric drive) axle of the electric vehicle; a generator coupled to a free axle for charging the battery; a non-electrical generator for charging the battery; and non-electrical system providing support function, such as an air conditioner, a vehicle fan, a vehicle heater, electronic components or devices, or a lightning subsystem operated by solar panel, by compress air, by gasoline or diesel, or by natural gas. The non-electrical generator and/or support system can also be coupled to the non-electric drive. As stated above, non-electrical can include solar power, thus electrical means battery in some embodiments of the present invention.

Figure 16:
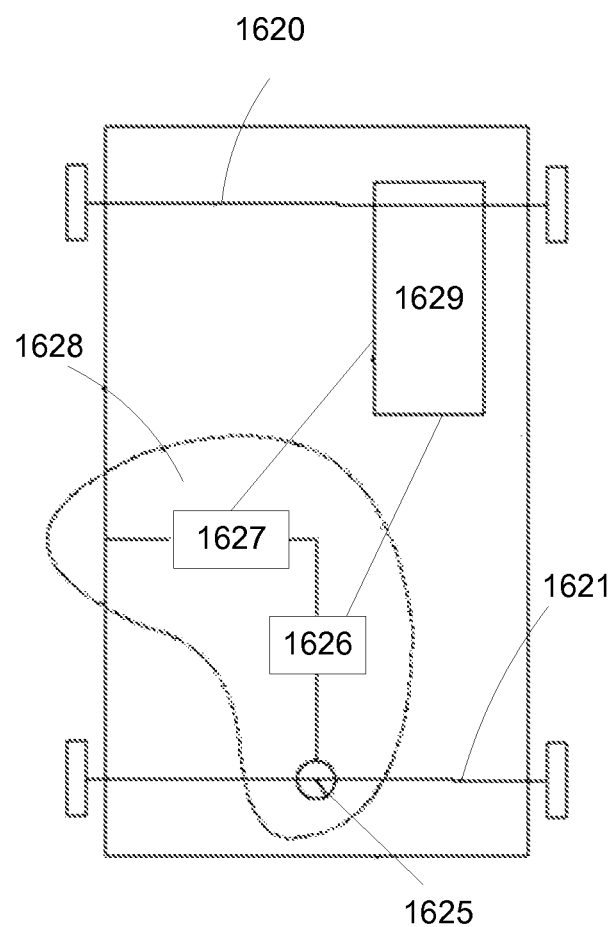
FIG. 16 illustrates an exemplary schematic configuration of an electric vehicle according to some embodiments of the present invention.

FIG. 16 illustrates a schematic configuration of an electric vehicle according to some embodiments. The electric vehicle can include an electric drive system 1628, for example, an electrical motor 1626 coupled to a gearbox 1625 to drive the vehicle axle 1621. A battery 1627 can provide electrical power to the motor 1626. As shown, the electric motor 1626 powers a two wheel axle (e.g., front or back axle), but other electric drive systems are also within the scope of the present invention, such as electric drive operating multiple axles, or operating individual wheels (e.g., one, two, three, four, or more wheels). For example, an electrical motor can operate one wheel of a three-wheel vehicle, or two electrical motors can operate two or more wheels of a four-wheel vehicle. The term "electrical", in this context, means "battery". Alternatively, the electric drive system can use other form of electrical power, such as solar panel, or a combination of solar and battery.

The electric drive system can be a main drive for the vehicle, using a motor or a motor/generator assembly coupled to the axle through direct drive, gear box or clutch. The battery system provides power to the electric drive. The electric vehicle can have power management to conserve battery power, controller to maintain proper current to the motor, capacitors to regulate or trickle charge the battery power, and other components such as regenerative brake, generator for battery recharge or plug-in battery recharger.

The electric vehicle further can include a non-electrical powered assembly 1629 to enhance the performance of the electric vehicle without interfering with the independent operation of the vehicle. For example, the assembly 1629 can include a non-electrical powered drive coupled to the free axle 1620 to operate the vehicle, for example, when the electric drive does not operate. The assembly can include a non-electrical power generator to charge the battery, thus extending the range of the electric vehicle. The assembly 1629 can include a non-electrical powered support system, such as a compress-air powered air conditioner, to reduce the power consumption of the battery, thus not affecting the range of the vehicle with supporting usages. The support system can include vehicle fan, vehicle lightning (head lights, tail lights, emergency lights, etc.), vehicle heater, electronic components (radio, global positioning system, compact disk, telephone support), etc.

The non-electrical assembly can be coupled to an axle, for example, axle 1620, to either drive the vehicle or to receive rotational power from the rotated axle 1620. The non-electrical assembly can be not coupled to any axle, stationed within the vehicle without attaching to any axle. For example, the non-electrical assembly can provide support usage to the vehicle, e.g., usage not related to driving the vehicle.

The non-electrical assembly can receive power from non-battery source, such as compressed air, natural gas, gasoline, diesel, solar panel, etc. In general, the term non-electrical used in the present invention can include non-battery (such as solar power), in addition to non-electrical current.

In general, the non-electrical assembly 1629 can extend the range of the vehicle without interfering with the operation of the electric drive system, allowing the incorporation of advanced developments in electric vehicles, such as better motor or better battery with minimum changes. With the assembly 1629 not integrated with the electric drive, removing the assembly 1629 or upgrading the electric drive system is a simple task and can be performed without affecting the electric vehicle operation. In some embodiments, the electric drive system is the main power for the electric vehicle, offering a fully electric vehicle system with the non-electrical assembly serving as a back up system, generally operating only when needed.

Figures 17A, 17B:
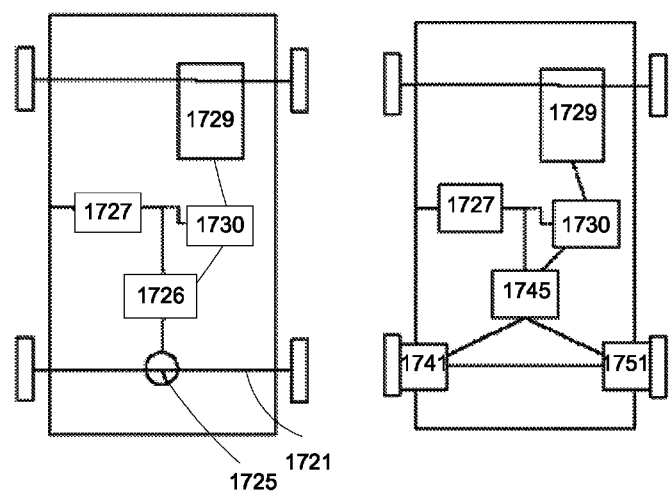
FIGS. 17A-17C illustrate exemplary configurations for the electric drive system according to some embodiments of the present invention.
Figure 17C:
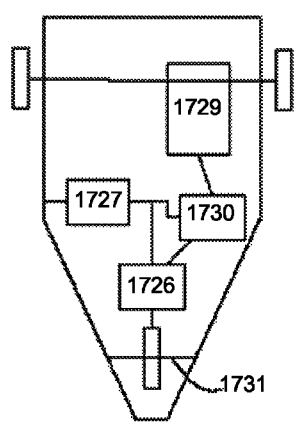

FIGS. 17A-17C illustrate configurations for the electric drive system according to some embodiments. FIG. 17A shows a four-wheel two-axle vehicle having an electric drive system coupled to one axle 1721, either the front or the back axle. The electric drive system comprises battery 1727 powering a motor 1726, which is coupled to the axle 1721 through gear system 1725. A controller 1700 couples to the battery 1727 and the motor 1726 to start, stop and in general, to control the power to be applied to the motor. A non-electrical assembly 1729 is supplied to improve the performance of the electric vehicle, such as for extending the range of the vehicle. The assembly 1729 can be totally separated from the electric drive system or only coupled to the controller 1700 in order not to interfere with the main power drive of the electric drive.

FIG. 17B shows a vehicle having electrical motors 1741/1751 coupled to two wheels of the vehicle. A synchronizer 1745 is included to control the power applied to the two motors in order to prevent slippage. The wheels can be arranged in pairs, e.g., forming an axle, with a gearbox to allow the motor to drive both wheels together. The gearbox can include speed change gearing, differential gearing, transfer case gearing, drive shafts, constant velocity joints, and any other components.

A vehicle may alternatively include a single wheel at one of the front or rear ends of the vehicle. FIG. 17C shows a three-wheel vehicle having an electric drive system coupled to a single wheel 1731. Other configurations can also be used, for example, electrical motor coupled to a wheel in three-wheel vehicles, or vehicles with three or more axles.

The present electric vehicle further can include a non-electrical powered assembly (including non-battery powered assembly) to enhance the performance of the electric vehicle without interfering with the independent operation of the vehicle. In some embodiments, the assembly can include a non-electrical powered drive coupled to the free axle (e.g., axle not connected to the electric drive) to operate the vehicle in a preferably mutual exclusive mode with the electrical powered drive system. The non-electrical powered drive can operate independently and can be coupled to the electric drive by a manual or semi-automatic switch that allows only the operation of either the electric drive or the non-electric drive. This assembly feature can provide a range extending feature to the electric vehicle, e.g., allowing the electrical vehicle to switch to non-electrical powered drive when running out of battery power, or to charge the battery with the non-electrical powered drive while running. The configuration can also provide the simplicity of the electric vehicle design, with the electric drive and the non-electric drive decoupled from each other. Switching from one drive to another drive can be performed by a manual switch, operated by a driver whenever desired. Switching can also be performed semi-automatically, for example, when the battery is running out to keep the vehicle operating continuously. In some embodiments, during the operation of the non-electric drive, the battery can be charged, for example, through the motor operated as a generator, through an additional generator coupled to the non-electric drive or to the driving axle.

One advantage of the present invention is the independent electric drive, e.g., the non-electrical portion is not intimately integrated with the electric drive. This feature can allow upgrading the electric drive by replacing appropriate components, e.g., replacing the electric motor with more power and better efficiency models, replacing the battery assembly with higher capacity models, etc. The present invention can realize the non-maturity of the electric vehicle, and thus offers models to allow ease of upgrading.

Figure 18:
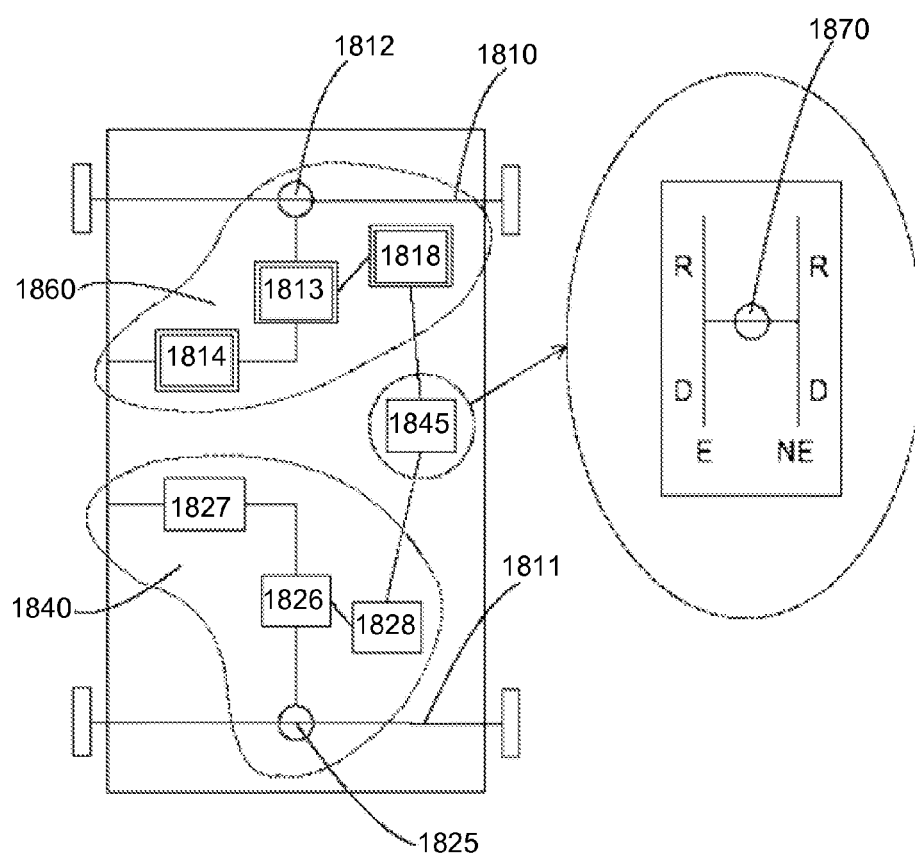
FIG. 18 illustrates an exemplary electric vehicle according to some embodiments of the present invention.

FIG. 18 illustrates an electric vehicle according to some embodiments. The vehicle can include an electric drive system 1840 coupled to axle 1811 to operate the vehicle. In some embodiments, the electric drive system can include a battery 1827 powering a motor 1826, which is coupled to gearbox 1825 to drive axle 1811. An optional controller 1828 can be coupled to the motor 1826 to control the motor, such as providing more power when needing high acceleration, or to regulate the power to the motor to optimize the consumption of electrical power from the battery. As shown, the electric drive system 1840 represents an exemplary electric drive system. Other electric drive systems can also be used, such as motor-on-wheel and battery management system.

In some embodiments, the electric vehicle can include a non-electric (included non-battery) drive assembly 1860, which comprises a non-electric power train. The non-electric drive assembly 1860 can include a non-electric engine, for example, an internal combustion engine 1813, powered by a power source, for example, a gasoline tank 1814, and coupled to a gearbox 1812 to drive the axle 1810. The non-electric drive assembly 1860 can include an optional controller 1818 coupled to the engine 1813 to control, monitor, and optimize power consumption. The non-electric drive assembly 1860 can drive the axle 1810 independent of the electric drive system 1840 driving the other axle 1811. In some embodiments, the non-electric drive assembly 1860 can drive the axle 1811, for example, by sharing a gear box with the electric drive assembly, or by a separate coupling with the axle 1811. In some embodiments, the electric drive assembly and the non-electric drive assembly can be independently operated, thus if sharing an axle, one drive is decoupled from that axle so that the other drive can operate.

In some embodiments, the non-electric engine can include a motor powered by a solar panel, an engine powered by natural gas, or an engine powered by compressed air.

A vehicle controller 1845 can be coupled to the electric drive system 1840 and the non-electric drive assembly 1860, for example, to control both drive systems. The two drive systems can be separate and operate independent of each other, with only the controller 1845 connecting the two systems. Thus any non-electric drive technology can be used without any modification. In addition, the electric drive system can also be easily upgraded with advanced electric drive technology, such as better battery or better motor. The present electric vehicle can be ready for today technology, ready to incorporate better electric power technology, and employing current non-electric power technology without any needless modifications.

In some embodiments, the controller 1845 can allow a mutual exclusive operation of the electric and non-electric power drives, e.g., only one drive operates the vehicle at any one time. This exclusiveness can allow a simple control of both drives, for example, when the control 1870 is moved to the electric drive E, the electric drive system is engaged (or turned on), and the non-electric drive system is disengaged (or turned off). Conversely, when the control 1870 is moved to the non-electric drive NE, the electric drive system is disengaged (or turned off), and the non-electric drive system is engaged (or turned on). Short start up time for electric drive may mean instantaneous power when turned on, so for electric power, engaging and disengaging could mean powering on and powering off. For non-electric power, disengaging might mean an idle position, where the drive is turned on but not engaged.

In some embodiments, the controller 1845 can be a manual controller, under the exclusive control of the driver. The manual controller can offer great control to the driver without or with minimum loss of control. For example, the driver knows when to stop the electric drive, and when to start the non-electric drive. Sensors could help to inform the driver of the conditions of the vehicle, such as the level of battery, and how far can the vehicle travel under electric power. Power conservation could be best performed by the driver, instead of an automatic controller. In some embodiments, the controller 1845 can have a partially automatic mode, for example, by automatically switching to non-electric power when the electric power is depleted.

Figure 19A:
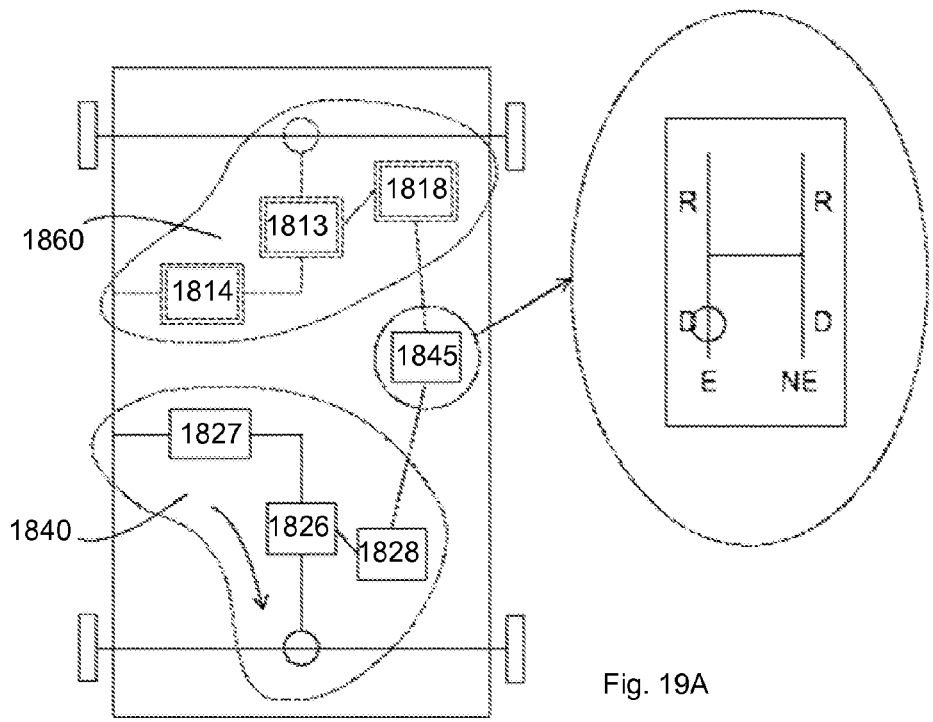
FIGS. 19A-19B illustrates two exclusive modes of operation for the present electric vehicle according to some embodiments of the present invention.
Figure 19B:
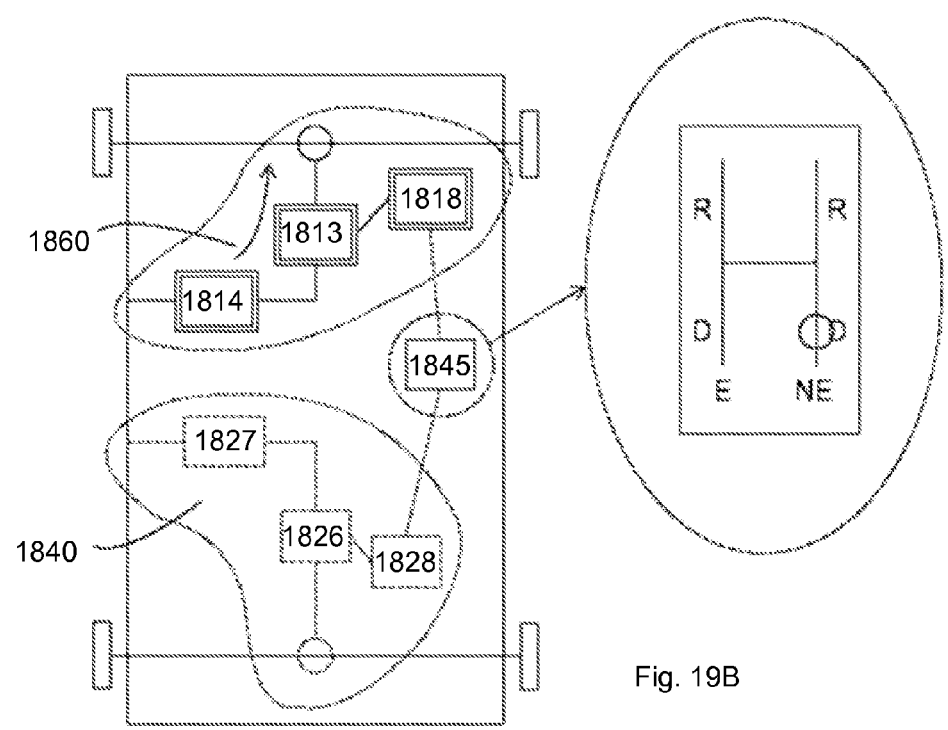

FIGS. 19A-19B illustrates two exclusive modes of operation for the present electric vehicle according to some embodiments. When the control 1870 is switched to electric drive, the vehicle can be powered by the electric motor with the non-electric engine turned off or disengaged (FIG. 19A). When the control 1870 is switched to non-electric drive, the vehicle can be powered by the non-electric motor with the electric engine turned off or disengaged (FIG. 19B). The mutual exclusive mode of operation can simplify the vehicle requirements, for example, by not needing a synchronization assembly to synchronize the front wheels with the back wheels since these wheels are driven by different power systems.

The non-electric engine can be a radial cam engine that is not powered by electrical power or by battery power, e.g., a motor, including a gasoline internal combustion engine, a diesel engine, a bio-diesel engine, a hydrogen-powered engine, an ethanol powered engine, a natural-gas powered engine, a fuel-cell engine, a steam engine, a compressed-air engine (e.g., an engine operated by compressed air), a motor powered by a solar panel, or any combination thereof.

One purpose of the non-electric drive assembly 1860 can be to extend the range of the electric vehicle. A major concern of electric vehicles is the limited range of the battery, together with the limited availability of charging station and the long time needed to fully charge the battery. Thus range extender capabilities could be useful until the electric vehicle technology is mature.

In some embodiments, the non-electric drive assembly 1860 can be designed to serve as an emergency operation. The emergency operation capability can give the users of electric vehicle some peace of mind, knowing that the electric vehicles won't be stranded in deserted areas. For example, the non-electric drive assembly can include a small engine, one that allows emergency operation but not for 100% operation. In some embodiments, the emergency engine can be smaller (either in engine size, power, or speed) as compared to the electric engine or as compared to a conventional gasoline engine. In some embodiments, the emergency engine can offer 30-80% capability of the electric drive system, for example, by providing a vehicle capacity, speed or power of 30-80% of the electric drive system. In some embodiments, the emergency engine offers less than 100%, less than 80%, 50%, or less than 30% of the power or speed of the electric drive. For example, gasoline or diesel engines less than 1 liter, preferably less than 0.75 liter, and more preferably less than 0.5 liter (such as a 350 cc or 250 cc motorcycle engine) can be used in the non-electric drive assembly. The gasoline or diesel engine can include 1, 2 or 3 cylinders. The small size of engine can reduce the weight and cost of the electric vehicle.

In some embodiments, the non-electric drive assembly 1860 can be designed to serve for long range operation. A typical battery range can be about 100 miles, as compared to a gasoline tank of 400 miles. Thus the non-electric drive assembly can allow the electric vehicle to operate for a longer range without stopping. For example, the electric drive can operate in city streets, and when reaching the highway, the non-electric drive can start.

Figure 20A:
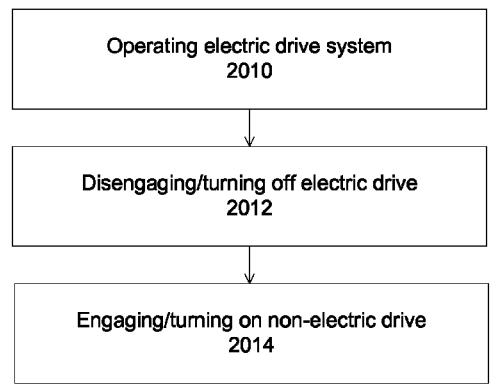
FIGS. 20A-20C illustrate exemplary flowcharts for driving the present electric vehicle according to some embodiments of the present invention.
Figure 20B:
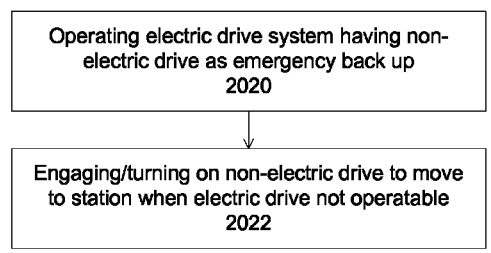
Figure 20C:
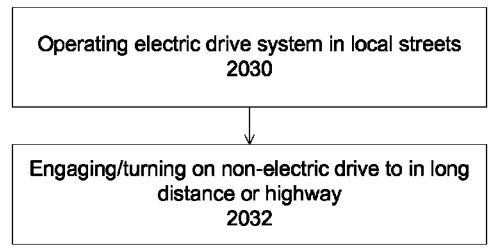

FIGS. 20A-20C illustrate flowcharts for driving the present electric vehicle according to some embodiments. In FIG. 20A, operation 2010 provides an operation of an electric vehicle by an electric drive system. Operation 2012 disengages or turns off the electric drive. Operation 2014 engages or turns on non-electric drive system to move the vehicle, after the electric drive is disengaged or turned off. Reverse operation is also possible, where the non-electric drive is disengaged or turned off before engaging or turning on the electric drive.

In FIG. 20B, operation 2020 provides an operation of an electric vehicle by an electric drive system, wherein the electric vehicle comprises a non-electric drive assembly as an emergency back up power train. Operation 2022 engages the non-electric power train to move the vehicle, for example, to a battery charging station, when the electric drive system is not capable of moving the vehicle, for example, by running out of battery.

In FIG. 20C, operation 2030 provides an operation of an electric vehicle by an electric drive system in local streets. Operation 2032 switches from the electric drive to a non-electric drive to drive long distance in highway conditions.

In some embodiments, the electric vehicle further can include a charging operation when operated by the non-electric drive assembly. For example, the electric motor can be doubled as a generator, a generator coupled to the axle or to the non-electric drive, or a separately-powered generator can be added to generate electricity to recharge the battery when the non-electric drive assembly is operating.

Figure 21:
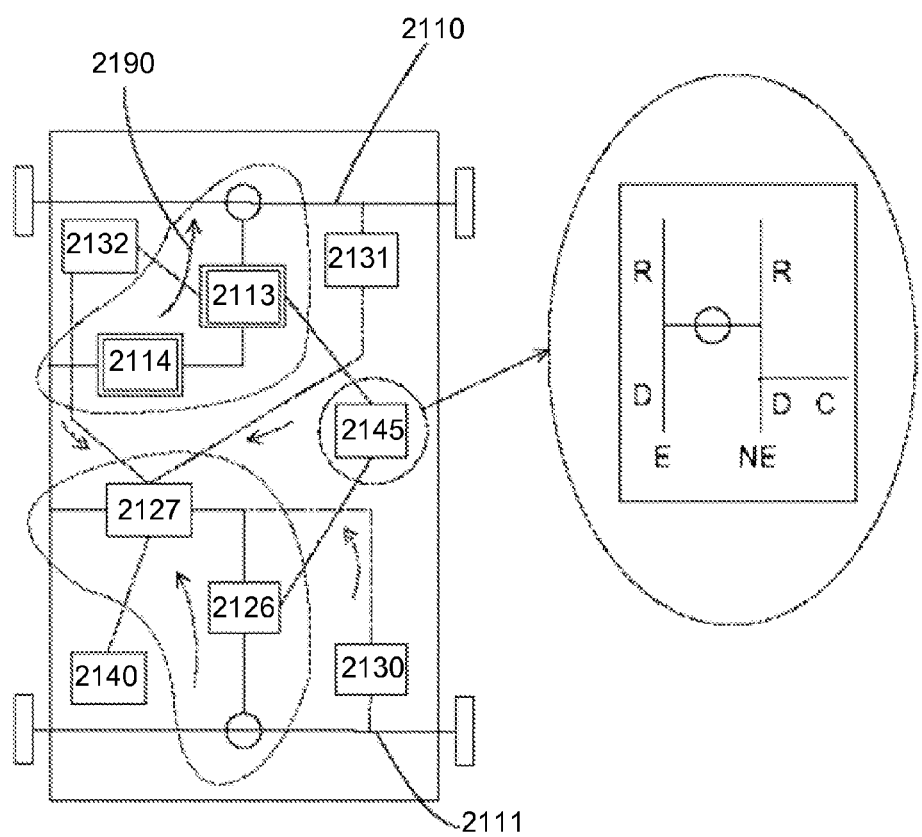
FIG. 21 illustrates exemplary configuration of generator to recharge the battery according to some embodiments of the present invention.

FIG. 21 illustrates a configuration of generator to recharge the battery according to some embodiments. When the vehicle is operating under the non-electric power, as shown by arrow 2190 showing power going to the non-electric axle 2110, the motor 2126 can be converted to a generator to recharge the battery 2127. Alternatively, a generator 2130 or 2131 can be coupled to the electric drive axle 2111 or 2110, respectively, to generate power to charge the battery. Or a generator 2132 can be coupled to the non-electric engine 2113 to generate power to charge the battery. The generators 2126/2130/2131/2132 can be powered from the axle, and thus do not need an external power source. Alternatively, a generator 2140 received power from the power source 2114 of the non-electric drive assembly can be included to charge the battery, with or without any engagement from the electric drive or the non-electric drive systems. The controller 2145 can include a control position, for example, C, deviated from the non-electric drive NE to initiate the charging operation. Alternatively, the controller can have a separate control position (not shown) to start the separate generator 2140.

In some embodiments, the present electric vehicle can include non-electric or non-battery support system, for example, air conditioner, heater, battery charger, fan, electronic support, or lightning. If the support system extracts little power, it can be connected to the battery. If the support system requires a significant amount of power, such as the air conditioner system, a separate non-electric support system with its own power source would help conserve the battery power. For example, an air conditioner running on compressed air can be included to provide the electric vehicle with air conditioner comfort and without interfering with the battery power. The compressed air can be recharged, similar to the battery, when needed. Alternatively, the air conditioner can be powered by a solar panel, or by gasoline powered engine, providing comfort during the heated sun. Other support systems, such as heater, battery charger, fan, electronic support, or lighting can also be powered by non-electric or non-battery power, such as solar panel, compressed air, gasoline, natural, etc.

Figure 22A:
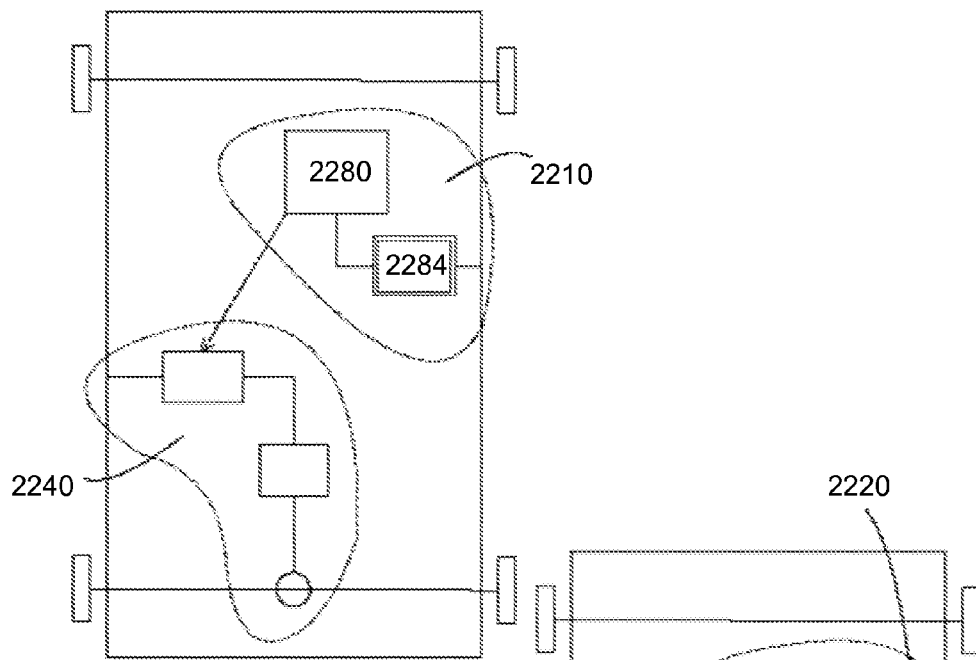
FIGS. 22A-22B illustrate exemplary electric vehicles with non-electric support (including non-battery) system according to some embodiments of the present invention.
Figure 22B:
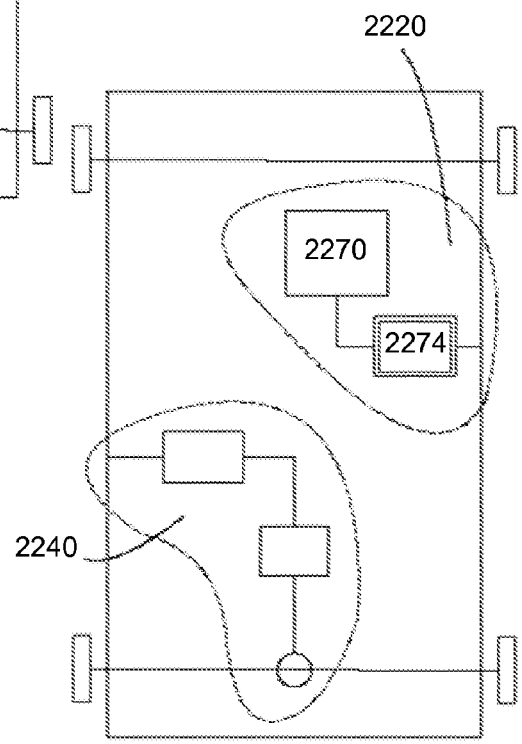

FIGS. 22A-22B illustrate electric vehicles with non-electric support (including non-battery) system according to some embodiments. FIG. 22A shows an electric vehicle comprising an electric drive system 2240 driving an axle of the vehicle. Other electric drive system can be used, and other electric drive components can be included, instead of in addition to the system shown. In addition, the electric vehicle further can include a non-electric (including non-battery) charger system 2210 including a generator, such as a gasoline-powered generator 2280, powering by a separate power source such as a gasoline tank 2284. The non-electric charger system 2210 can provide emergency power to the battery when the battery is running out, or provide continuous battery charging during long distance travel. The non-electric support system can be used with or without non-electric drive assembly or generator as disclosed above.

The charger system 2210 can include a solar powered generator, a natural gas powered generator, a compressed air generator, or a generator using any non-battery type of power.

In some embodiments, the vehicle can be operated in electric drive mode. In out-of-battery emergency situation, the vehicle can be stopped. The non-electric charger system 2210 can then be started to charge the battery. Thus the electric vehicle can be restarted after a short time to recharge the battery. Alternatively, the non-electric charger system 2210 can be started when the battery power reaches a certain level. This can ensure that the electric vehicle always has electric power to drive. The starting of the non-electric charger system 2210 can be automatic or manual.

In some embodiments, the vehicle can be operated in electric drive mode, together with the operation of the non-electric charger system 2210. For example, in planning a long distance travel, a distance longer than the range of the battery, the electric vehicle can be in charging mode during driving. This can ensure that the battery has enough power to reach the destination without stopping for recharging.

FIG. 22B shows an electric vehicle including an electric drive system 2240 driving an axle of the vehicle, together with a non-electric support system 2220, such as a compressed-air air-conditioner 2270, powered by compressed air cylinder 2274, included to provide air conditioner comfort to the electric vehicle. The non-electric support system can be used with or without non-electric drive assembly or generator as disclosed above.

The support system 2220 can include an air conditioner, a heater, a fan, an electronic support, a lightning system, etc., powered by solar panels, natural gas, gasoline, diesel, compressed air, or any non-battery type of power.

In some embodiments, the vehicle can be operated by the electric drive to drive the vehicle. The non-electric support system can be operated to provide support functions to the vehicle, either when the vehicle is running or when the vehicle is not running. For example, the air-conditioner can be turned on or off depending on the need of the user, regardless of the conditions of the electric drive system.

In this description, the term "vehicle" or other similar term is meant to be a motor vehicle, such as a passenger automobile, a sports utility vehicle (SUV), a bus, a truck, or any other types of automobiles. The vehicle can include motorcycles.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A hybrid vehicle comprising
an electric motor configured to drive the hybrid vehicle, wherein the electric motor is powered by an battery;
a radial cam internal combustion engine configured to drive the hybrid vehicle,
wherein the radial cam engine is powered by a non-battery power source,
wherein the radial cam engine comprises a piston,
wherein the radial cam engine comprises a cam coupled to a camshaft,
wherein the cam is configured to provide a substantially flat-top piston motion,
wherein the cam is configured to provide a substantially flat-bottom piston motion,
wherein the cam is configured to provide a force profile of the piston that is substantially similar to a torque/force ratio profile of the camshaft at least in a first duration, wherein the first duration is between a top-dead-center position of the piston to an inflection point of the piston motion.

2. A hybrid vehicle as in claim 1 wherein the combustion phase of the radial cam engine is limited to the duration of the substantially flat-top portion of the piston motion.

3. A hybrid vehicle as in claim 1 wherein the force profile of the piston comprises a profile that is zero at the top-dead-center position and at the inflection point.

4. A hybrid vehicle as in claim 1 wherein the cam comprises three or more lobes.

5. A hybrid vehicle as in claim 1 wherein the cam is configured to provide an asymmetric piston motion.

6. A hybrid vehicle as in claim 1 wherein the radial cam is configured to provide an asymmetric piston motion, the asymmetric piston motion comprises a first duration that is longer than a quarter of the full piston cycle.

7. A hybrid vehicle as in claim 1 wherein the radial cam is configured to provide an asymmetric piston motion, the asymmetric piston motion comprises a force in the first duration that is higher in magnitude than a maximum force in another duration of the full piston cycle.

8. A hybrid vehicle as in claim 1 wherein the piston motion is offset from the rotational center of the cam.

9. A hybrid vehicle as in claim 1 wherein the radial cam engine is optimized for running at a constant speed for charging the battery.

10. A hybrid vehicle as in claim 1 wherein the radial cam engine is optimized for light weight and low power for running only in an emergency mode.

11. A hybrid vehicle as in claim 1 wherein the radial cam engine is powered by natural gas.

12. A hybrid vehicle comprising
an electric motor configured to drive the hybrid vehicle, wherein the electric motor is powered by an battery;
a radial cam internal combustion engine configured to drive the hybrid vehicle,
wherein the radial cam engine is powered by a non-battery power source,
wherein the radial cam engine comprises a piston,
wherein the radial cam engine comprises a cam coupled to a camshaft,
wherein the cam is configured to provide a substantially flat-top piston motion,
wherein the cam is configured to provide a substantially flat-bottom piston motion,
wherein the cam is configured to provide a force profile of the piston that is substantially similar to a torque/force ratio profile of the camshaft at least in a first duration, wherein the first duration is between a top-dead-center position of the piston to an inflection point of the piston motion,
wherein the force profile of the piston comprises a profile that is zero at the top-dead-center position and at the inflection point,
wherein the cam is configured to provide an asymmetric piston motion;
a controller for switching control of the hybrid vehicle between the electric motor and the radial cam engine.

13. A hybrid vehicle as in claim 12 wherein the duration of the substantially flat-top portion of the piston motion is less than 30% of the full cycle of the piston motion.

14. A hybrid vehicle as in claim 12 wherein the combustion phase of the radial cam engine is limited to the duration of the substantially flat-top portion of the piston motion.

15. A hybrid vehicle as in claim 12 wherein the asymmetric piston motion comprises a first duration that is longer than a quarter of the full piston cycle or wherein the asymmetric piston motion comprises a force in the first duration that is higher in magnitude than a maximum force in another duration of the full piston cycle.

16. A hybrid vehicle as in claim 12 wherein the piston motion is offset from the rotational center of the cam.

17. A hybrid vehicle as in claim 12
wherein the radial cam engine is optimized for running at a constant speed for charging the battery,
wherein the radial cam engine is optimized for light weight and low power for running only in an emergency mode, or
wherein the radial cam engine is powered by natural gas.

* * * * *